(12) United States Patent
Kimes

(10) Patent No.: US 9,482,294 B2
(45) Date of Patent: Nov. 1, 2016

(54) COUPLING AND CONTROL ASSEMBLY INCLUDING A SENSOR

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 15/078,154

(22) Filed: Mar. 23, 2016

(65) Prior Publication Data

US 2016/0201739 A1  Jul. 14, 2016

Related U.S. Application Data

(63) Continuation-in-part of application No. 14/675,850, filed on Apr. 1, 2015, which is a continuation-in-part of application No. 14/288,819, filed on May 28, 2014, now Pat. No. 9,234,552, application No. 15/078,154, (Continued)

(51) Int. Cl.
   *B60W 10/02* (2006.01)
   *F16D 27/108* (2006.01)
   (Continued)

(52) U.S. Cl.
   CPC .............. *F16D 27/108* (2013.01); *F16D 27/00* (2013.01); *F16D 27/10* (2013.01); *F16D 27/14* (2013.01); *F16D 41/02* (2013.01); *F16D 41/12* (2013.01); *F16D 41/125* (2013.01); *F16D 41/14* (2013.01);
   (Continued)

(58) Field of Classification Search
   CPC ........ F16D 27/14; F16D 41/12; F16D 27/10; F16D 41/14; F16D 27/00; F16D 41/02; F16D 41/04; F16D 27/108; F16D 41/125; F16D 2300/18
   See application file for complete search history.

(56) References Cited

U.S. PATENT DOCUMENTS

| 2,960,287 A | 11/1960 | Barlow |
| 3,130,989 A | 4/1964 | Lannen |

(Continued)

FOREIGN PATENT DOCUMENTS

| GB | 1007475 A | 10/1965 |
| WO | 2015030899 A1 | 3/2015 |

OTHER PUBLICATIONS

International Search Report and Written Opinion; related application No. PCT/US2016/014236; date of mailing Mar. 24, 2016.

(Continued)

*Primary Examiner* — David J Hlavka
(74) *Attorney, Agent, or Firm* — Brooks Kushman P.C.

(57) ABSTRACT

A coupling and control assembly including a sensor for providing an electrical signal for electronic transmission control is provided. The assembly includes a first coupling member which supports the sensor and a locking element and a second coupling member supported for rotation about a rotational axis. The second coupling member has a coupling face oriented to face radially with respect to the axis and has a set of ferromagnetic or magnetic locking formations. An electromechanical component is also supported by the first coupling member. Both the locking element and the sensor are in close-spaced opposition to the coupling face. The sensor senses magnetic flux to produce an electrical output signal indicative of a speed of rotation of the second coupling member. A variable magnetic field is generated in response to rotation of the locking formations past the sensor.

24 Claims, 17 Drawing Sheets

Related U.S. Application Data which is a continuation-in-part of application No. 14/675,853, filed on Apr. 1, 2015, which is a continuation-in-part of application No. 14/288,819, filed on May 28, 2014, now Pat. No. 9,234,552.

(60) Provisional application No. 61/941,741, filed on Feb. 19, 2014.

(51) Int. Cl.

| | |
|---|---|
| *F16D 27/14* | (2006.01) |
| *F16D 41/12* | (2006.01) |
| *F16D 27/00* | (2006.01) |
| *F16D 27/10* | (2006.01) |
| *F16D 41/02* | (2006.01) |
| *F16D 41/14* | (2006.01) |

(52) U.S. Cl.
CPC . *F16D 2300/18* (2013.01); *F16D 2500/10493* (2013.01)

(56) References Cited

U.S. PATENT DOCUMENTS

| | | | |
|---|---|---|---|
| 4,050,560 A | 9/1977 | Torstenfelt | |
| 4,056,747 A | 11/1977 | Orris et al. | |
| 4,200,002 A | 4/1980 | Takahashi | |
| 4,340,133 A | 7/1982 | Blersch | |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,449,057 A | 9/1995 | Frank | |
| 5,453,598 A | 9/1995 | Hackett et al. | |
| 5,486,758 A | 1/1996 | Hammerle | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,806,643 A | 9/1998 | Fitz | |
| 5,847,469 A | 12/1998 | Tabata et al. | |
| 5,856,709 A | 1/1999 | Ibaraki et al. | |
| 5,871,071 A | 2/1999 | Sink | |
| 5,898,249 A | 4/1999 | Boggs, III | |
| 5,918,715 A | 7/1999 | Ruth et al. | |
| 5,927,455 A | 7/1999 | Baker et al. | |
| 5,954,174 A | 9/1999 | Costin | |
| 5,964,331 A | 10/1999 | Reed et al. | |
| 5,979,627 A | 11/1999 | Ruth et al. | |
| 5,996,758 A | 12/1999 | Baxter, Jr. | |
| 6,019,699 A | 2/2000 | Hoshiya et al. | |
| 6,065,576 A | 5/2000 | Shaw et al. | |
| 6,075,302 A | 6/2000 | McCleer | |
| 6,116,394 A | 9/2000 | Ruth | |
| 6,121,454 A * | 9/2000 | Zoghbi | C07D 213/61 546/245 |
| 6,125,980 A | 10/2000 | Ruth et al. | |
| 6,129,190 A | 10/2000 | Reed et al. | |
| 6,186,299 B1 * | 2/2001 | Ruth | F16D 41/12 192/113.32 |
| 6,193,038 B1 * | 2/2001 | Scott | B23P 15/00 192/46 |
| 6,237,931 B1 | 5/2001 | Marola | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,386,349 B1 | 5/2002 | Welch | |
| 6,481,551 B1 | 11/2002 | Ruth | |
| 6,503,167 B1 | 1/2003 | Sturm | |
| 6,505,721 B1 | 1/2003 | Welch | |
| 6,571,926 B2 | 6/2003 | Pawley | |
| 6,814,201 B2 | 11/2004 | Thomas | |
| 6,846,257 B2 | 1/2005 | Baker et al. | |
| 6,854,577 B2 | 2/2005 | Ruth | |
| 6,953,409 B2 | 10/2005 | Schmidt et al. | |
| 6,982,502 B1 | 1/2006 | Sendaula et al. | |
| 7,025,188 B2 | 4/2006 | Lindenschmidt et al. | |
| 7,093,512 B2 | 8/2006 | Ibamoto et al. | |
| 7,100,756 B2 | 9/2006 | Kimes et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,383,930 B2 | 6/2008 | Kimes et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,661,518 B2 | 2/2010 | Kimes | |
| 7,690,455 B2 | 4/2010 | Kano et al. | |
| 7,690,492 B2 | 4/2010 | Gooden et al. | |
| 7,806,795 B2 | 10/2010 | Oba et al. | |
| 7,942,781 B2 | 5/2011 | Kimes | |
| 8,007,396 B2 | 8/2011 | Kimes et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,187,141 B2 | 5/2012 | Goleski et al. | |
| 8,196,724 B2 | 6/2012 | Samie et al. | |
| 8,272,488 B2 | 9/2012 | Eisengruber et al. | |
| 8,286,772 B2 | 10/2012 | Eisengruber | |
| 8,324,890 B2 | 12/2012 | Lin | |
| 8,418,825 B2 | 4/2013 | Bird | |
| 8,491,439 B2 | 7/2013 | Kimes | |
| 8,491,440 B2 | 7/2013 | Kimes et al. | |
| 8,720,659 B2 | 5/2014 | Pawley | |
| 8,813,929 B2 | 8/2014 | Kimes | |
| 8,888,637 B2 | 11/2014 | Kimes | |
| 9,109,636 B2 | 8/2015 | Kimes et al. | |
| 9,127,724 B2 | 9/2015 | Kimes et al. | |
| 9,234,552 B2 | 1/2016 | Kimes | |
| 9,255,614 B2 | 2/2016 | Kimes | |
| 2002/0000724 A1 | 1/2002 | Kalargeros et al. | |
| 2003/0126870 A1 | 7/2003 | Meckstroth et al. | |
| 2004/0159517 A1 | 8/2004 | Thomas | |
| 2004/0216975 A1 | 11/2004 | Ruth | |
| 2005/0279602 A1 | 12/2005 | Ruth | |
| 2006/0021838 A1 | 2/2006 | Kimes et al. | |
| 2006/0124425 A1 | 6/2006 | Fetting et al. | |
| 2006/0138777 A1 | 6/2006 | Hofbauer et al. | |
| 2006/0185957 A1 | 8/2006 | Kimes et al. | |
| 2006/0249345 A1 | 11/2006 | Ruth | |
| 2007/0056825 A1 | 3/2007 | Fetting, Jr. et al. | |
| 2007/0107960 A1 | 5/2007 | Takami et al. | |
| 2007/0278061 A1 | 12/2007 | Wittkopp et al. | |
| 2008/0093190 A1 | 4/2008 | Belmont | |
| 2008/0110715 A1 | 5/2008 | Pawley | |
| 2008/0135369 A1 | 6/2008 | Meier | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0188338 A1 | 8/2008 | Kimes et al. | |
| 2008/0196990 A1 * | 8/2008 | Cali | F16D 41/125 192/46 |
| 2008/0223681 A1 | 9/2008 | Stevenson et al. | |
| 2008/0245360 A1 | 10/2008 | Almy et al. | |

(56) References Cited

U.S. PATENT DOCUMENTS

| | | |
|---|---|---|
| 2009/0062058 A1 | 3/2009 | Kimes et al. |
| 2009/0084653 A1 | 4/2009 | Holmes |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0233755 A1 | 9/2009 | Kimes |
| 2009/0255773 A1 | 10/2009 | Seufert et al. |
| 2009/0266667 A1 | 10/2009 | Samie et al. |
| 2010/0071497 A1 | 3/2010 | Reisch et al. |
| 2010/0105515 A1 | 4/2010 | Goleski et al. |
| 2010/0127693 A1 | 5/2010 | Wenzel et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0233026 A1 | 9/2011 | Pawley |
| 2012/0021862 A1 | 1/2012 | Isken et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2012/0231913 A1 | 9/2012 | Samie et al. |
| 2013/0062151 A1 | 3/2013 | Pawley |
| 2013/0277164 A1 | 10/2013 | Prout et al. |
| 2013/0319812 A1 | 12/2013 | Wys et al. |
| 2014/0102844 A1 | 4/2014 | Greene et al. |
| 2014/0190785 A1 | 7/2014 | Fetting et al. |
| 2014/0238811 A1 | 8/2014 | Heuver |
| 2014/0284167 A1 | 9/2014 | Kimes |
| 2014/0305761 A1 | 10/2014 | Kimes |
| 2015/0000442 A1 | 1/2015 | Kimes et al. |
| 2015/0014116 A1 | 1/2015 | Kimes et al. |
| 2015/0060225 A1 | 3/2015 | Kimes |
| 2015/0061798 A1 | 3/2015 | Seid et al. |

OTHER PUBLICATIONS

International Search Report and Written Opinion; related application No. PCT/US2016/014243; date of mailing Mar. 24, 2016.

International Preliminary Report on Patentability; related International application No. PCT/US2014/056716; date of issuance of report Mar. 29, 2016.

International Preliminary Report on Patentability; related International application No. PCT/US2014/056749; date of issuance of report Mar. 29, 2016.

International Preliminary Report on Patentability; related International application No. PCT/US2014/057140; date of issuance of report Mar. 29, 2016.

International Search Report and Written Opinion; related International application No. PCT/US2016/013836; date of mailing Mar. 30, 2016.

Office Action; related application U.S. Appl. No. 14/882,505; notification date May 19, 2016.

Notice of Allowance and Fee(s) Due; related U.S. Appl. No. 14/882,505; dated Aug. 1, 2016.

International Search Report and Written Opinion; International application No. PCT/US2011/036634; date of mailing Aug. 25, 2011.

International Preliminary Report on Patentability; International application No. PCT/US2011/036634; date of issuance of report Jun. 12, 2013.

International Search Report and Written Opinion; International application No. PCT/US12/050742; date of mailing Nov. 20, 2012.

International Search Report and Written Opinion; International application No. PCT/US2014/041631; date of mailing Oct. 9, 2014.

International Search Report and Written Opinion; International application No. PCT/US2014/049044; Date of mailing Nov. 24, 2014.

Notice of Allowance and Issue Fee(s) Due; corresponding U.S. Appl. No. 13/992,785; date of mailing Jan. 30, 2015.

Notice of Allowance and Fee(s) Due; related U.S. Appl. No. 14/086,202; dated Sep. 14, 2015.

Notice of Allowance and Fee(s) Due; related U.S. Appl. No. 14/675,840; date of mailing Dec. 3, 2015.

International Preliminiary Report on Patentability; related International application No. PCT/US2014/041631; date of issuance of report Mar. 1, 2016.

International Search Report and Written Opinion; International application No. PCT/US16/14063; date of mailing Mar. 16, 2016.

* cited by examiner

COUPLING AND CONTROL ASSEMBLY INCLUDING A SENSOR

CROSS-REFERENCE TO RELATED APPLICATIONS

This application is a continuation-in-part of U.S. application Ser. Nos. 14/675,850 and 14/675,853 both filed Apr. 1, 2015. Those applications are continuation-in-part of U.S. application Ser. No. 14/288,819 filed May 28, 2014, now U.S. Pat. No. 9,234,552, which claims benefit of U.S. provisional application Ser. No. 61/941,741 filed Feb. 19, 2014. This application is also related to U.S. application Ser. Nos. 15/078,171 and 15/078,334, filed on the same date as this application.

TECHNICAL FIELD

This invention generally relates to coupling and control assemblies which include sensors.

Overview

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission. U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 4,056,747; 5,052,534; 5,070,978; 5,449,057; 5,486,758; 5,678,668; 5,806,643; 5,871,071; 5,918,715; 5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 9,255,614; 9,234,552; 9,127,724; 9,109,636; 8,888,637; 8,813,929; 8,491,440; 8,491,439; 8,286,772; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2015/0061798; 2015/0000442; 2014/0305761; 2013/0277164; 2013/0062151; 2012/0152683; 2012/0149518; 2012/0152687; 2012/0145505; 2011/0233026; 2010/0105515; 2010/0230226; 2009/0233755; 2009/0062058; 2009/0211863; 2008/0110715; 2008/0188338; 2008/0185253; 2006/0124425; 2006/0249345; 2006/0185957; 2006/0021838, 2004/0216975; and 2005/0279602.

Some other U.S. patent documents related to at least one aspect of the present invention includes U.S. Pat. Nos. 8,720,659; 8,418,825; 5,996,758; 4,050,560; 8,061,496; 8,196,724; and U.S. published application Nos. 2014/0190785; 2014/0102844; 2014/0284167; 2012/0021862; 2012/0228076; 2004/0159517; and 2010/0127693.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMC) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing element) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

SUMMARY OF EXAMPLE EMBODIMENTS OF THE INVENTION

An object of at least one embodiment of the present invention is to provide a low cost coupling and control assembly including a sensor which provides an electrical signal for electronic transmission control wherein a coupling member of the assembly carries or supports the sensor.

In carrying out the above object and other objects of at least one embodiment of the present invention, a coupling and control assembly including a sensor is provided. The sensor provides an electrical signal for electronic transmission control. The assembly includes a controllable coupling assembly including first and second coupling members supported for rotation relative to one another about a rotational axis. The first coupling member has a first coupling face oriented to face radially with respect to the axis and has a locking element and the sensor. The second coupling member has a second coupling face oriented to face radially with respect to the axis and has a set of ferromagnetic or magnetic locking formations. The first and second members are positioned relative to each other so that the locking element and the sensor are in close-spaced opposition to the locking formations. The assembly also includes an electromechanical component including a reciprocating member. The component is supported so that the reciprocating member moves the locking element across a gap between the coupling faces in response to the component receiving an electrical control signal. The locking element abuttingly engages one of the locking formations in a coupling position of the locking element to prevent relative rotation in one direction about the axis. The sensor senses magnetic flux to produce an electrical output signal indicative of a speed of the relative rotation. A variable magnetic field is generated in response to rotation of the locking formations past the sensor.

The sensor may include a magnetic field sensing element.

The sensor may be back-biased wherein the locking formations are ferromagnetic.

The locking formations may comprise radially extending, angularly-spaced teeth.

The component may comprise a solenoid.

The locking element may be a radial pawl.

The second coupling member has a width wherein each locking formation extends the entire width of the second coupling member.

The first coupling member may be an outer coupling member and the second coupling member may be an inner coupling member.

The assembly may further include a biasing member to bias one of the reciprocating member and the locking member.

The biasing member may bias the locking member towards an uncoupling position or may bias the reciprocating member to an extended position.

The reciprocating member and the locking element may be connected together so that the reciprocating member moves the locking element across the gap.

Further in carrying out the above object and other objects of at least one embodiment of the present invention, a coupling and control assembly including a sensor is provided. The sensor provides an electrical signal for electronic transmission control. The assembly includes a controllable coupling assembly including first and second coupling members mounted for rotation relative to one another about a rotational axis. The first coupling member has a first coupling face oriented to face axially in a first direction with respect to the axis and a second coupling face oriented to face radially with respect to the axis and which has a locking element and a sensor. The second coupling member has a third coupling face oriented to face axially in a second direction opposite the first direction with respect to the axis and fourth coupling face oriented to face radially with respect to the axis and having a set of ferromagnetic or magnetic locking formations. The assembly also includes an electromechanical component including a reciprocating member. The component is positioned relative to the second coupling member so that both the locking member and the sensor are in close-spaced opposition to the fourth coupling face of the second coupling member. The reciprocating member moves the locking element across a gap between the second and fourth coupling faces in response to the component receiving an electrical control signal. The locking element abuttingly engages one of the ferromagnetic or magnetic locking formations to prevent relative rotation in one direction about the axis in a coupling position of the locking element. The sensor senses magnetic flux to produce an electrical output signal indicative of a speed of the relative rotation. A variable magnetic field is generated in response to rotation of the set of ferromagnetic or magnetic locking formations past the sensor.

The second coupling member has a width wherein each locking formation extends the entire width of the second coupling member.

The sensor may include a magnetic field sensing element.

The sensor may be back-biased wherein the locking formations are ferromagnetic.

The set of ferromagnetic or magnetic locking formations may comprise radially extending, angularly-spaced teeth.

The component may comprise a solenoid.

The locking element may be a radial pawl.

The first coupling member may be an outer coupling member and the second coupling member may be an inner coupling member.

The reciprocating member and the locking element may be connected together so that the reciprocating member moves the locking element across the gap.

The assembly may further comprise a biasing member to bias one of the reciprocating member and the locking member.

The biasing member may bias the locking member towards an uncoupling position or the biasing member may bias the reciprocating member to an extended position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
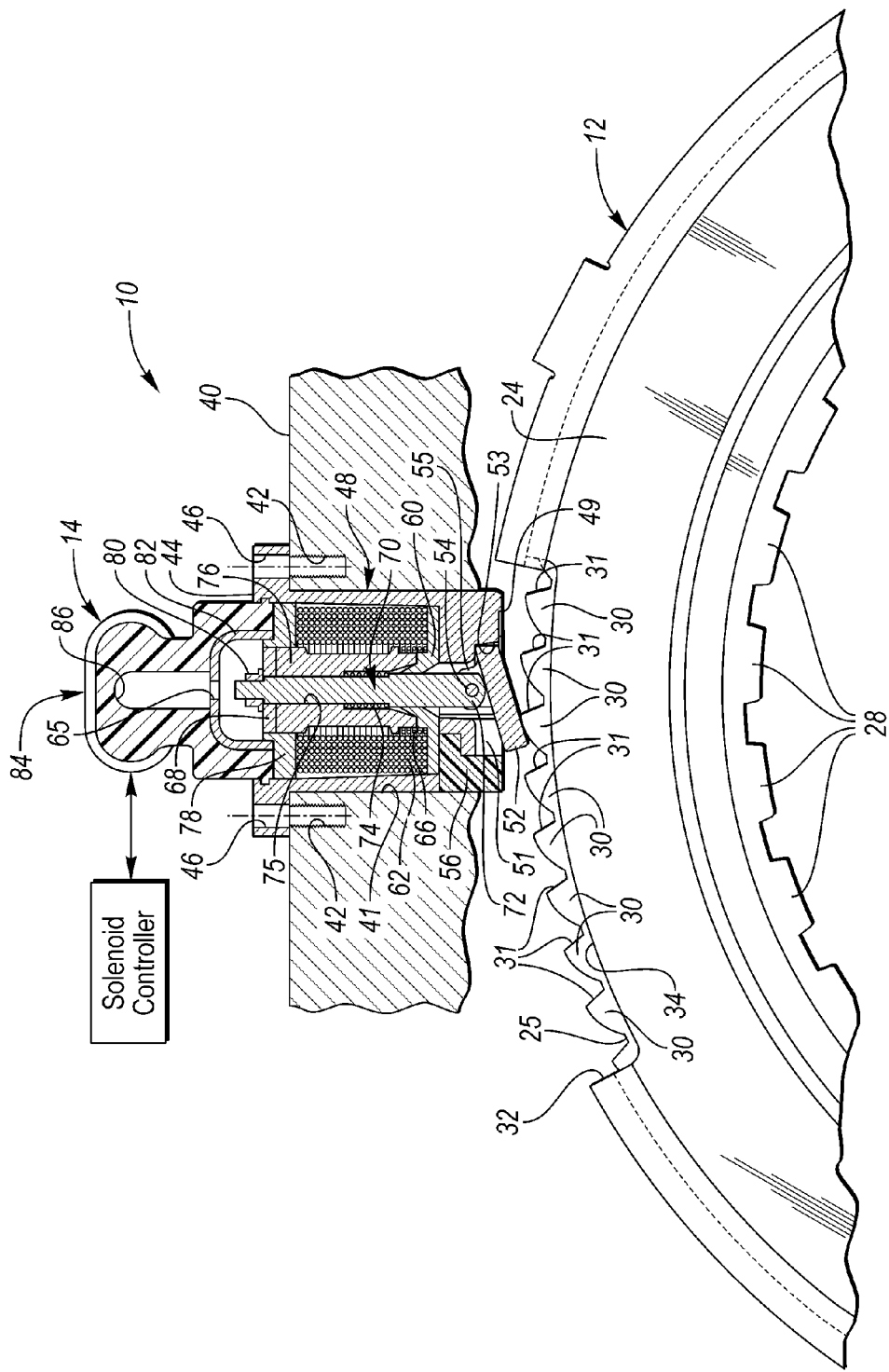
FIG. 5 is a partial block diagram and side view, opposite the side view of FIG. 4, but with one of the components in cross section and inserted in a case (also in cross section) of an electronic vehicle transmission constructed in accordance with at least one embodiment of the parent application to this application.
Figure 6:
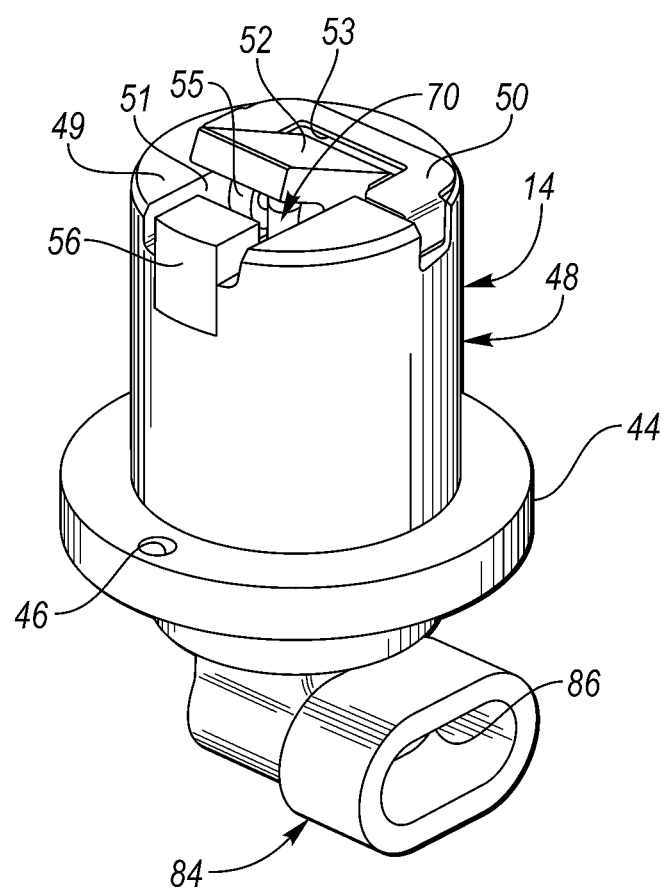
FIG. 6 is a perspective, schematic bottom view of the electromechanical component of the prior Figures.

Referring now to the drawing figures, there is illustrated one embodiment of an electronic vehicular transmission, generally indicated at 10 in FIG. 5. The transmission 10 includes a transmission case 40 having a bore 41 which extends completely through the case 40. As is well known in the art, the transmission case 40 has associated therewith an environment which is hostile to electrical components during use of the transmission 10 primarily because of: (1) hot oil contained therein, (2) contaminants in the oil which cause shorting of any electrical circuits therein and (3) vibration.

The transmission 10 also includes an electromechanical component, generally indicated at 14, which is capable of operating in the hostile environment of the case 40. The component 14 may be referred to herein below as an SSI (i.e. selectable solenoid insert). The component 14 is inserted through the bore 41 and held therein by threaded fasteners (not shown) which extend through holes 46 formed through an annular flange 44 of a housing, generally indicated at 48, of the component 14. The fasteners extend into threshold holes 42 formed in the case 40 about the bore 41 to secure the component 14 to the case 40.

Figure 1:
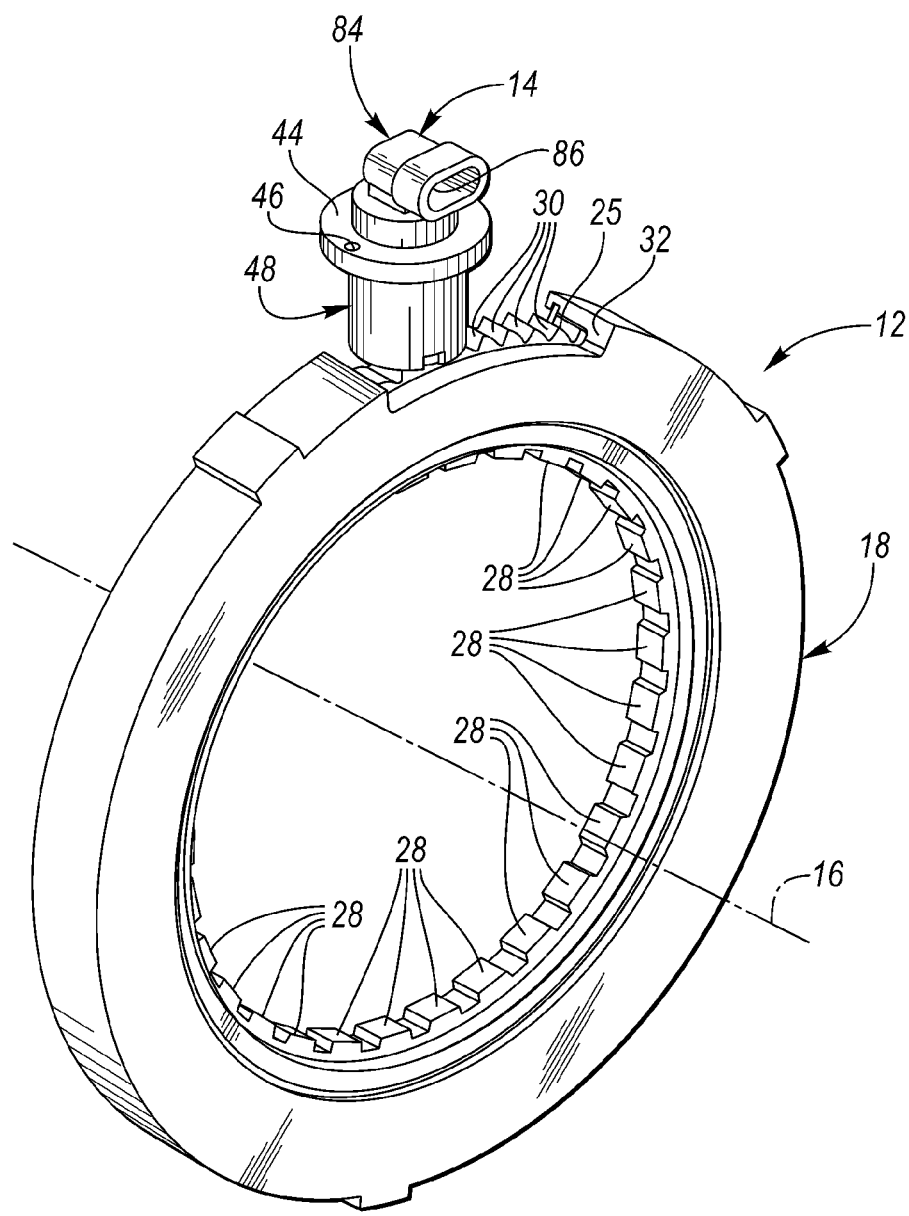
FIG. 1 is a schematic view of a controllable coupling assembly and an electromechanical component constructed in accordance with at least one embodiment of the parent application to this application.
Figure 2:
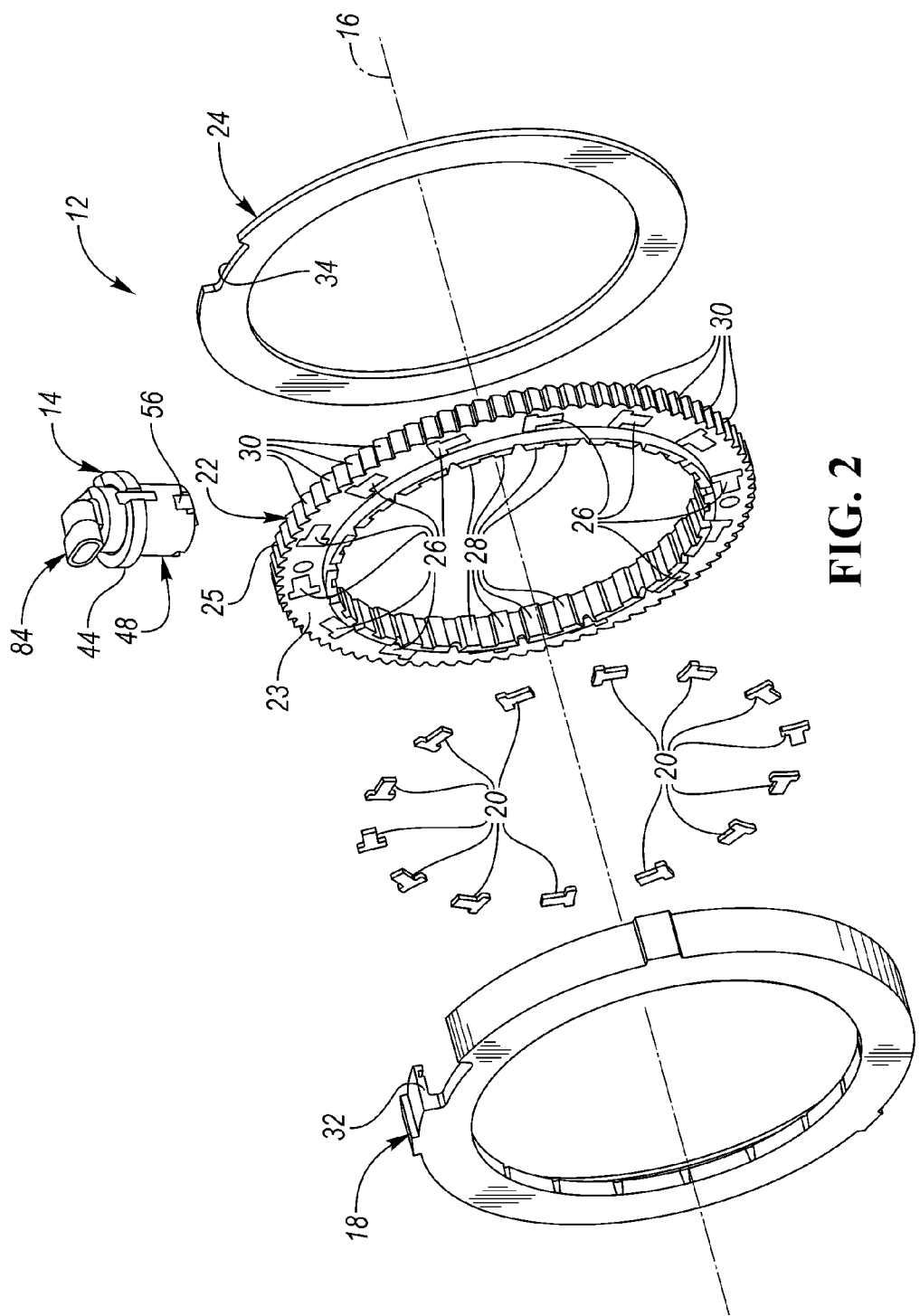
FIG. 2 is an exploded, perspective view of the assembly and component of FIG. 1.
Figure 3:
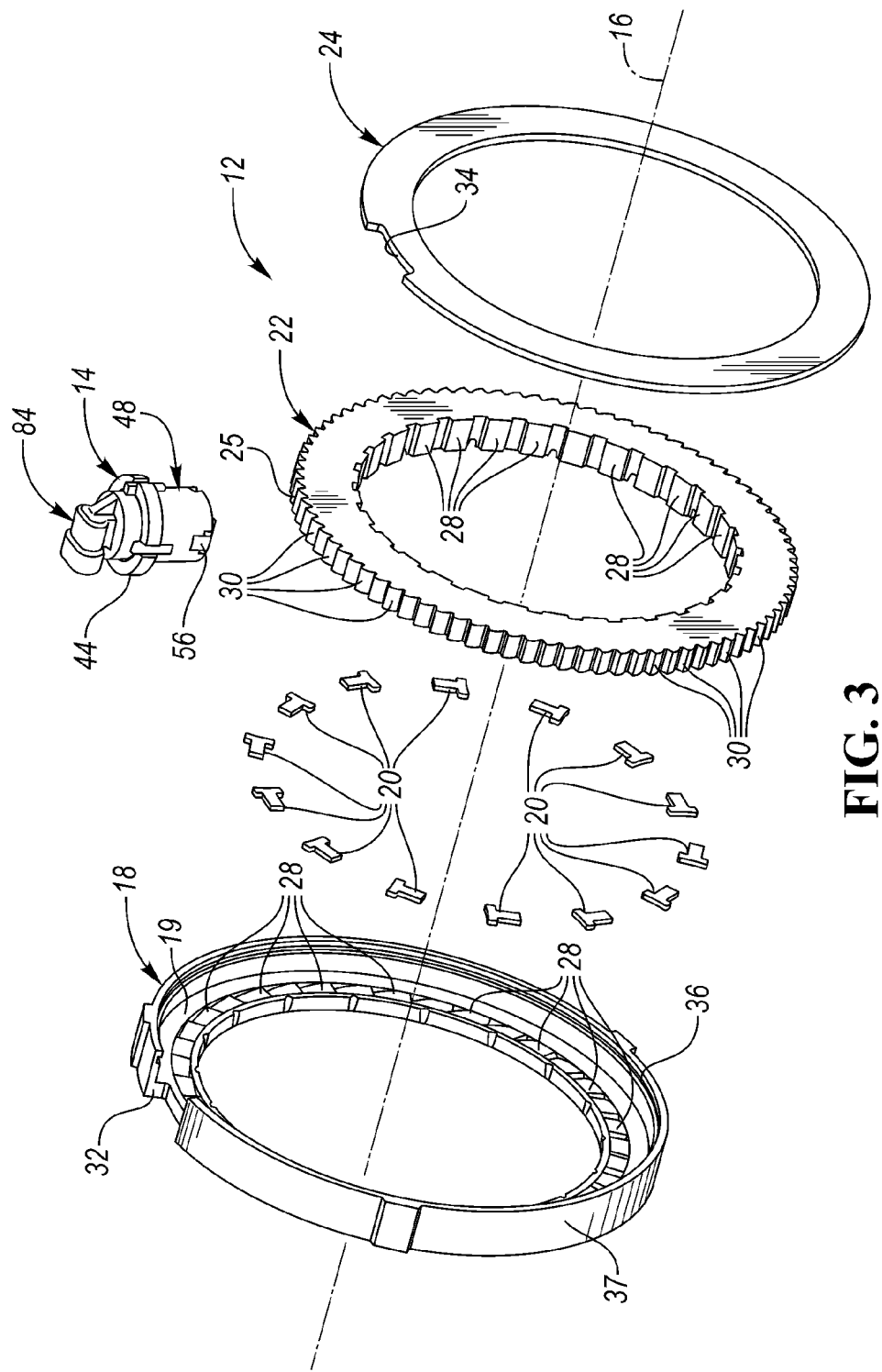
FIG. 3 is a view of the assembly and component similar to the view of FIG. 2 but from a different angle.

Referring now to FIGS. 1-3, the transmission 10 also includes a controllable coupling assembly, generally included at 12, which, in turn, includes first and second coupling members, 18 and 22, respectively, mounted for rotation relative to one another about a rotational axis 16. The first coupling member 18 has a first coupling face 19 oriented to face axially in a first direction with respect to the axis 16 and the second coupling member 22 has a second coupling face 23 oriented to face axially in a second direction opposite the first direction with respect to the axis 16. The second coupling member 22 also has a third coupling face 25 oriented to face radially with respect to the axis 16 and having a set of locking formations or teeth 30 formed therein. The teeth 30 are preferably ferromagnetic or magnetic teeth 30.

The coupling assembly 12 also includes a set of forward locking elements or struts 20 which are received within angularly spaced pockets 26 formed in the face 23 of the coupling member 22. The coupling member 22 has a set of splines 28 formed on its inner diameter for drivingly engaging a drive or driven member (not shown) for rotation about the axis 16.

The assembly 12 also includes a locking ring or plate, generally indicated at 24, for insertion into an annular groove 36 of an axially extending wall 37 of the coupling member 18 to hold the coupling members 18 and 22 together. The locking plate 24 has a circumferential cutout 34 which coincides or is aligned with a circumferential cutout 32 provided in the wall 37 of the member 18 when the plate 24 is inserted into the groove 36. This feature allows a locking element or strut 52 of the component 14 to engage the teeth 30 of the member 22 as shown in FIGS. 4 and 5.

The housing part or housing 48 has an outer coupling face 49 (FIG. 5) in close-spaced opposition to the coupling face 25 of the member 22 when the members 18 and 22 are joined and assembled together by the locking ring 24 and after insertion of the component 14 into the bore 41 of the case 40.

The outer coupling face 49 of the housing part 48 has a single, T-shaped recess or pocket 51. The recess 51 defines a load-bearing first surface shoulder 53. The coupling face 25 of the member 22 has a plurality of reverse notches or teeth 30. Each tooth of the teeth 30 defines a load-bearing second surface or shoulder 31.

Figure 4:
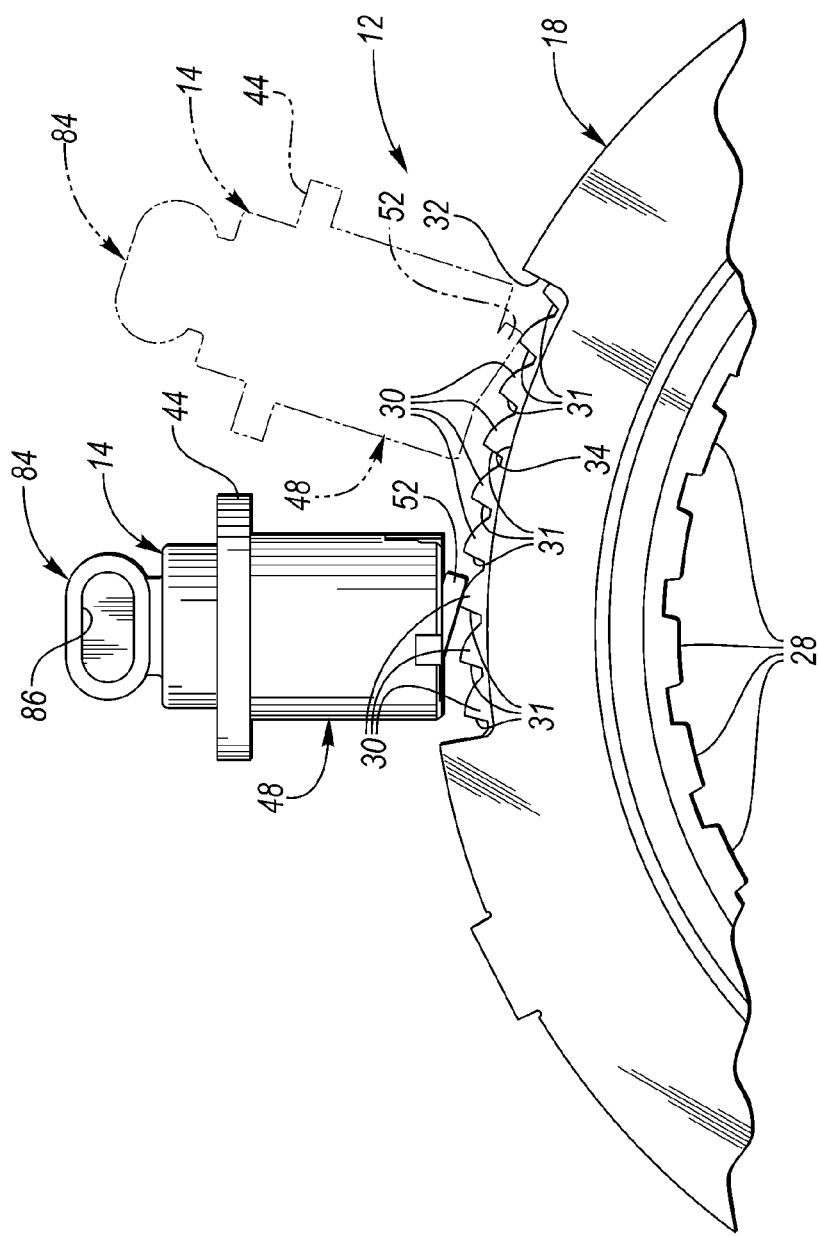
FIG. 4 is an enlarged side view, partially broken away, of the assembly and component of FIG. 1 together with a second electromechanical component in phantom with locking elements of the components partially extended towards locking formations of a coupling member of the assembly.

The locking strut or element 52 is capable of extending between the coupling faces 25 and 49 of the member 22 and the part 48, respectively, between coupling and uncoupling positions when the assembly 12 and case 40 are assembled together as is shown in FIGS. 4 and 5.

The element 52 may comprise a ferromagnetic locking element or strut movable between first and second positions. The first position (i.e. coupling position) is characterized by abutting engagement of the locking element 52 with the load-bearing surface or shoulder 31 of one of the teeth 30 and the shoulder 53 of the pocket 51 formed in an end wall of the housing part 48. The second position (i.e. non-coupling position) is characterized by non-abutting engagement of the locking element 52 with a load-bearing shoulder 31 of at least one of the teeth 30 and the end wall of the housing part 48.

The electromechanical component or apparatus (i.e. SSI) 14 includes the housing part 48 which has a closed axial end including the end wall. The end wall has the outer coupling face 49 with the single pocket 51 which defines the load-bearing shoulder 53 which is in communication with an inner face of the end wall. The housing part 48 may be a metal (such as aluminum) injection molded (MIM) part.

The apparatus 14 also includes an electromagnetic source, including at least one excitation coil 62 which is at least partially surrounded by a skirt of the housing part 48.

Electrical insulated wiring 64 supplies electrical power to the coil 62 from a power source located outside the hot oil environment. The wiring 64 extends from the coil 62, through a hole 65 (FIG. 5) formed through an end seal 82, through a cavity 86 formed through an overmold 84 and to a solenoid controller.

The strut 52 is retained within the pocket 51 by a clevis-shaped retainer 50. The strut 52 is movable outwardly from the pocket 51 to its extended, coupling position characterized by abutting engagement of the strut 52 with a load-bearing surface or shoulder 31 of one of the teeth 30.

Figure 7:
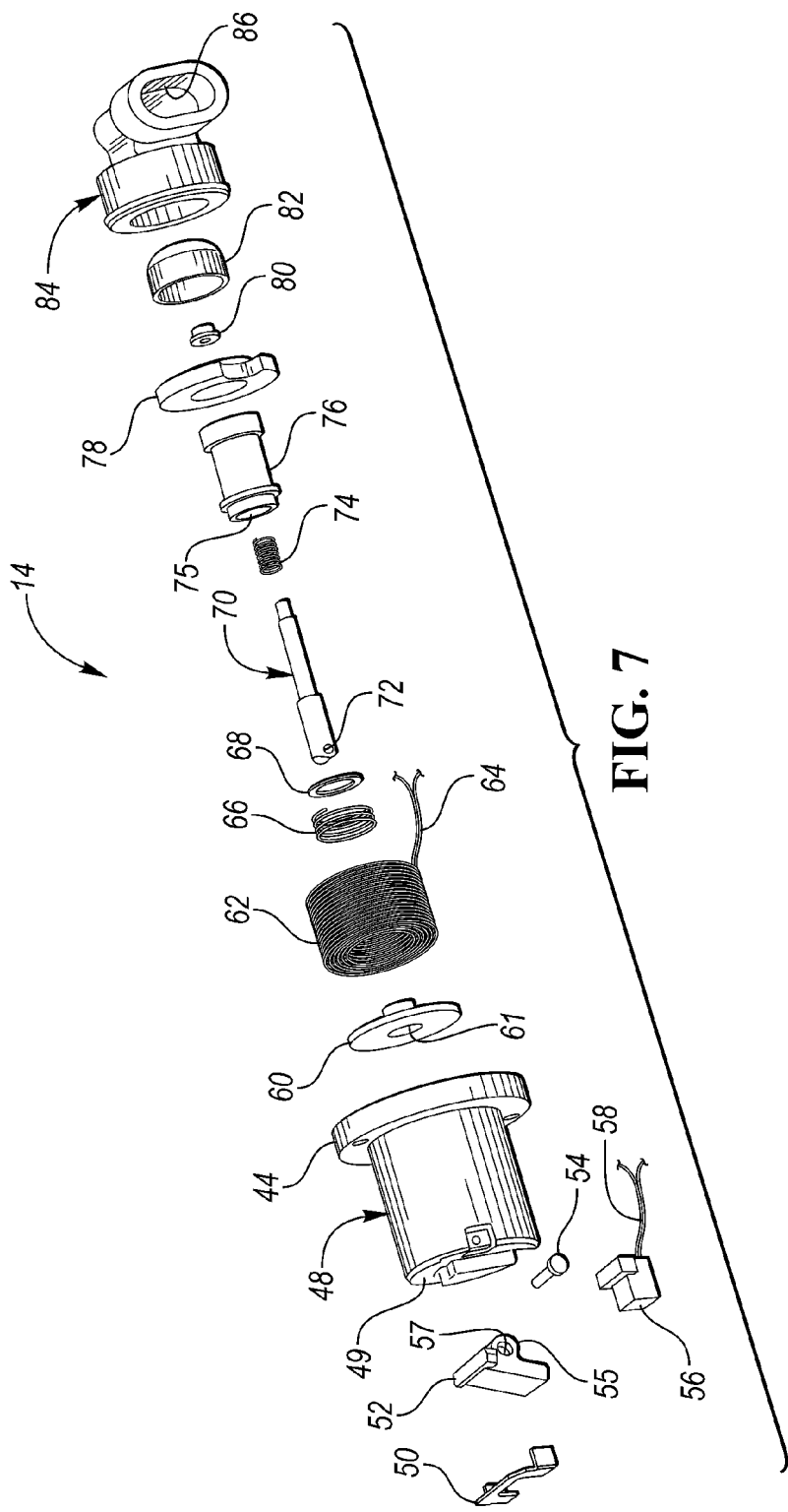
FIG. 7 is an exploded, perspective view of the electromechanical component.
Figure 8:
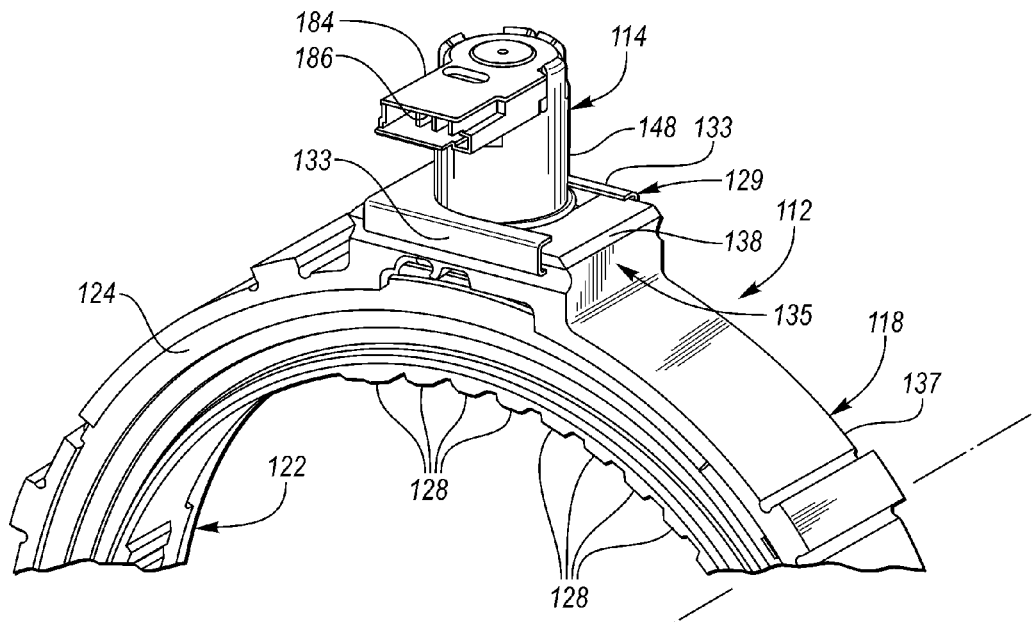
FIG. 8 is a schematic perspective front view, partially broken away, of a controllable coupling assembly and an electromechanical component constructed in accordance with at least one embodiment of the present invention.
Figure 9:
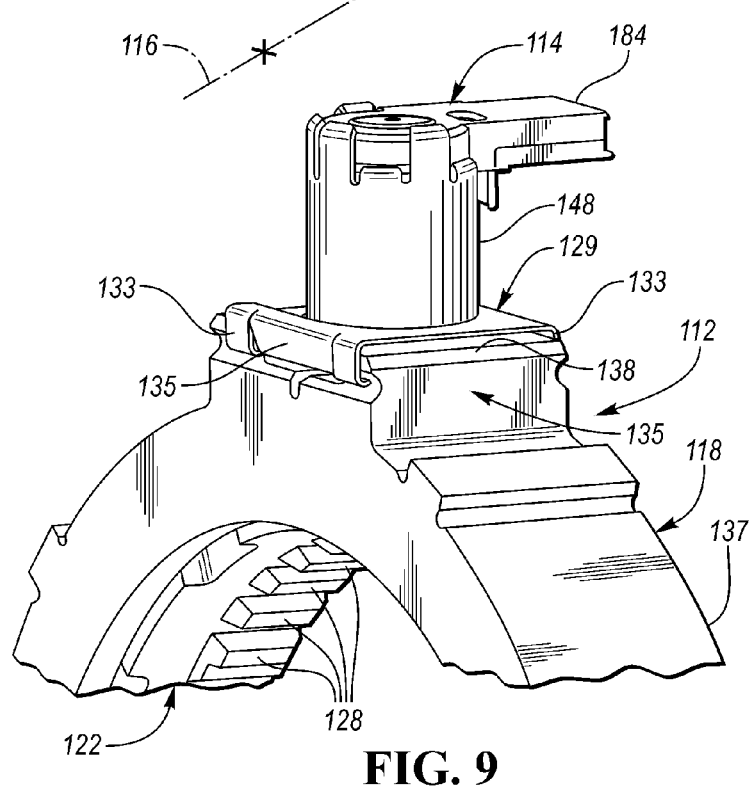
FIG. 9 is a view, similar to the view of FIG. 8, but showing the rear of the assembly and the component.
Figure 10:
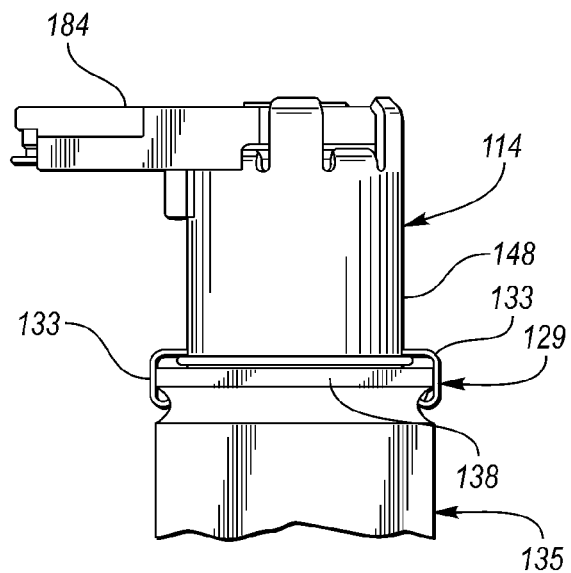
FIG. 10 is a side schematic view, partially broken away, of the component attached to a raised portion of an outer coupling member of the assembly via a bracket.
Figure 11:
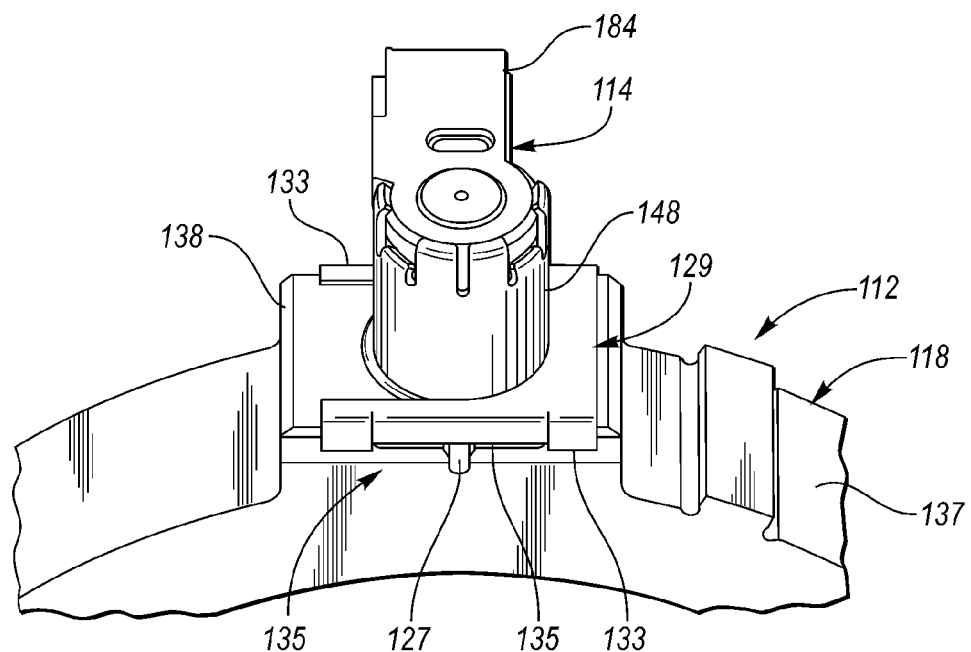
FIG. 11 is a view, similar to the view of FIG. 9, but showing the top of the assembly, the component and the bracket.
Figure 12:
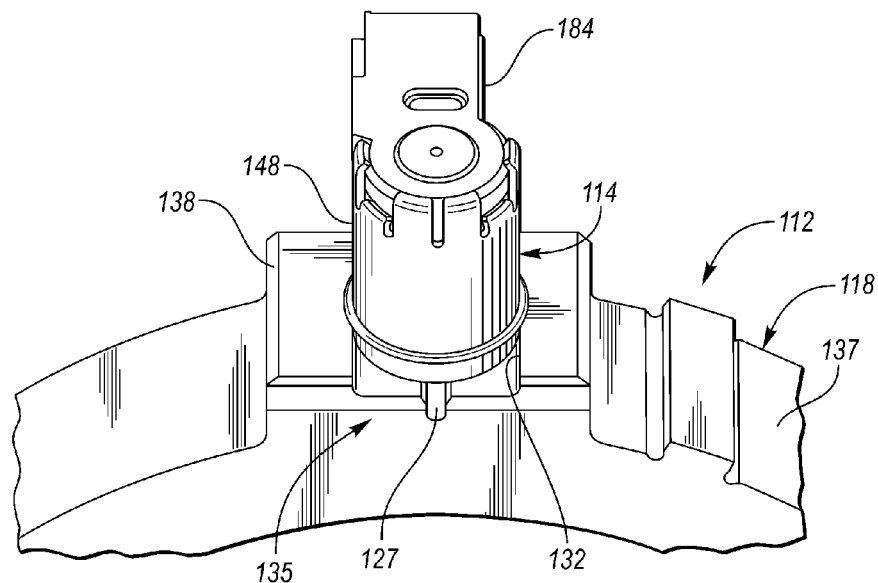
FIG. 12 is a view, similar to the FIG. 11, but without the bracket.
Figure 13:
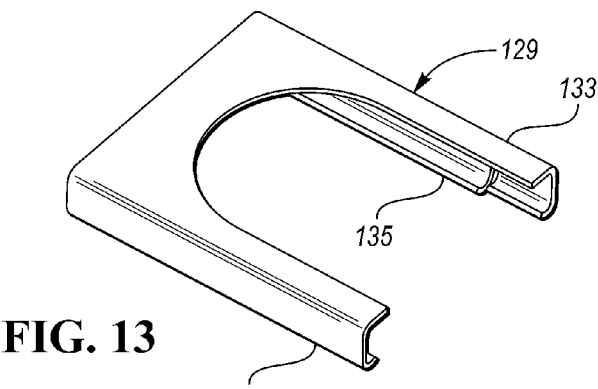
FIG. 13 is a schematic perspective top view of the bracket of FIG. 11.
Figure 14:
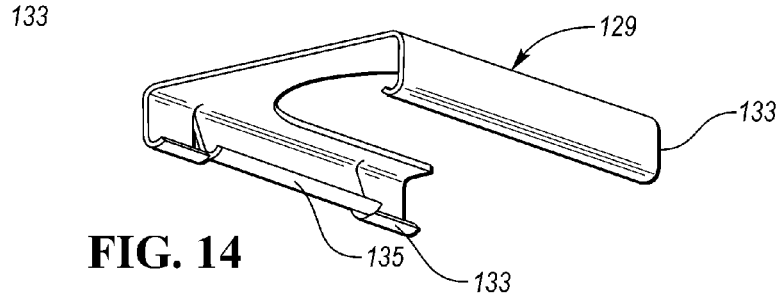
FIG. 14 is a schematic perspective bottom view of the bracket of FIG. 13.
Figure 15:
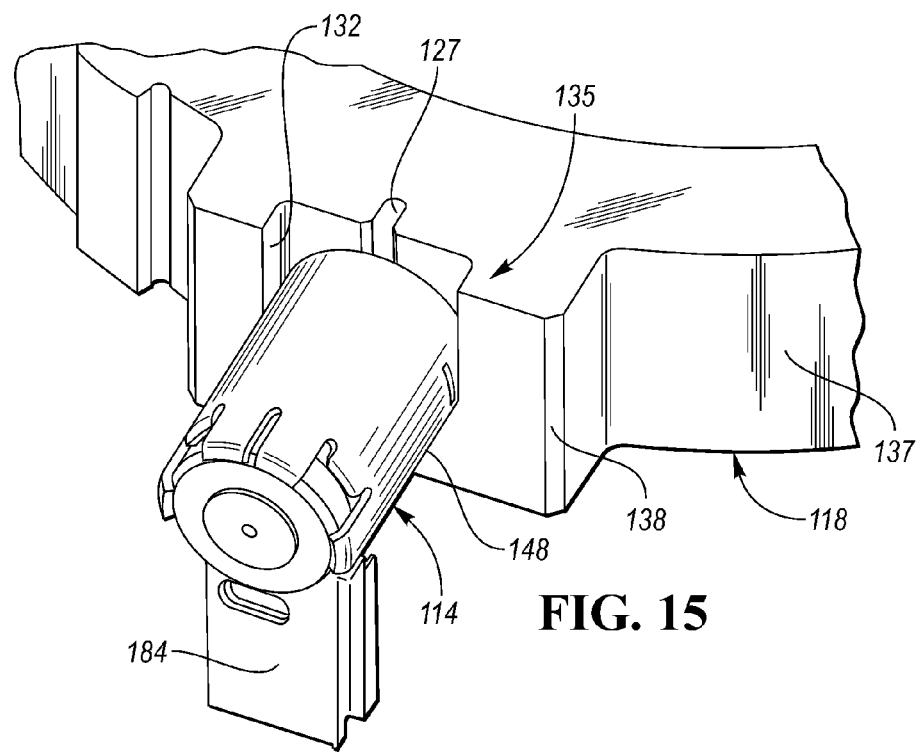
FIG. 15 is a schematic perspective view, partially broken away, of the rear of the outer coupling member with a supported component.
Figure 16:
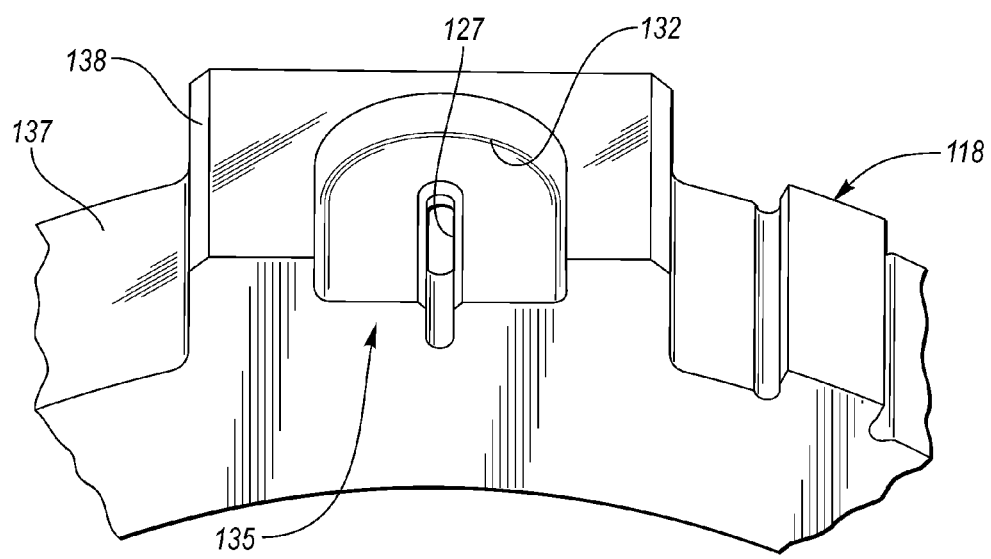
FIG. 16 is a top, schematic perspective view, partially broken away, of the coupling member of FIG. 15 without the component.

The apparatus 14 also includes a reciprocating plunger, generally indicated at 70, arranged concentrically relative to the at least one excitation coil 62 and is axially movable when the at least one excitation coil 62 is supplied with current via the wires 64. The coil 62 is wound or located about an actuator core or armature 76 and is potted between plates 60 and 78. The armature 76 is also axially movable upon coil excitation. The plate 60 abuts against the inner face of the housing end wall. The plunger 70 extends through a hole 61 (FIG. 7) formed through the plate 60 and is connected at its leading end 72 to the element 52 to move the element 52 between its coupling and uncoupling positions. The plunger 70 also extends through an aperture 75 formed through the armature 76. The opposite end of the plunger 70 has a locking nut or cap 80 positioned thereon which limits movement of the plunger 70 in the aperture 75 towards the teeth 30 by abutting against the lower surface of an annular spacer 68 which abuts against the lower surface of the armature 76.

The element 52 is pivotally connected to the apertured leading end 72 of the plunger 70 wherein the plunger 70 pivotally moves the element 52 within the pocket 51 in response to reciprocating movement of the plunger 70 which, in turn, moves axially in response to reciprocating movement of the armature 76.

The apparatus 14 also preferably includes a return spring 66, which extends between the plate 60 and a shoulder in the outer surface of the actuator core or armature 76, to return the plunger 70 and the armature 76 to their home position when the coil 62 is de-energized, thereby returning the element 52 to its uncoupling position. The apparatus 14 also includes a spring 74 which urges the plunger 70 to move the element 52 towards its coupling position. In other words, the biasing member or spring 66, urges the plunger 70 via the armature 76 to a return position which corresponds to its uncoupling position of the element 52 while the biasing member or spring 66 urges the plunger 70 and its connected element 52 to its coupled position.

The housing part 48 and/or the plate 78 may have holes (not shown) to allow oil to circulate within the housing part 48. Preferably, the at least one coil 62, the housing part 48, the armature 76 and the plunger 70 comprise a low profile solenoid. The locking element 52 may be a metal (such as aluminum) injection molded (i.e. MIM) strut.

The element 52 includes at least one and, preferably, two projecting leg portions 55 which provide an attachment location for the leading end 72 of the plunger 70. Each leg portion 55 has an aperture 57. The apparatus 14 further comprises a pivot pin 54 received within each aperture 57 and the aperture formed in the leading end 72 to allow rotational movement of the element 52 in response to reciprocating movement of the plunger 70 wherein the leading end 72 of the plunger 70 is connected to the element 52 via the pivot pin 54.

Preferably, each aperture 55 is an oblong aperture which receives the pivot pin 54 to allow both rotation and translational movement of the element 52 in response to reciprocating movement of the plunger 70. Each locking strut 52 may comprise any suitable rigid material such as ferrous metal, (i.e. steel).

The component 14 also includes a magnetic field speed sensor or device 56 which may comprise a differential Hall-effect device which senses speed of the teeth 30 as they rotate past the sensor 56. The teeth 30 may carry or support a rare-earth, automotive grade, magnet or pellet (not shown) which may be embedded in a hole formed in the outer surface of the teeth. In that case, the teeth 30 may be non-ferrous teeth such as aluminum teeth. Alternatively, and preferably, the teeth 30 are ferromagnetic teeth.

The device 56 is typically back-biased, has two wires 58 (FIG. 7) and provides a current output based on speed of rotation of the teeth 30 past the sensor 56. The device 56 accurately detects the speed with a single output (i.e., current output). The device 56 is preferably mounted adjacent to the pocket 51 and the wires 58 extend through the aperture 61 formed in the plate 60. The wires 58 and the wires 64 of the coil 62 are coupled to the solenoid controller which, in turn, is coupled to a main controller to supply drive signals to the coil 62 in response to control signals from the main controller. The device 56 may be held in place by fasteners or by an adhesive so that a side surface of the device 56 is in close proximity to a side surface of the strut 52 in the uncoupling position of the strut 52.

The sensor 56 is typically back-biased when the teeth 30 are ferromagnetic and typically includes a Hall sensor or sensing element mounted on a circuit board on which other electronics or components are mounted, as is well-known in the art. The sensor 56 is preferably back-biased in that it includes a rare-earth magnet which creates a magnetic flux or field which varies as the teeth 30 move past the sensor 56. The sensor 56 may comprise a back-biased, differential Hall Effect device.

In other words, the device 56 is preferably a back-biased device wherein the device 56 includes a rare earth pellet or magnet whose magnetic field varies as the teeth 30 move therepast. The variable magnetic field is sensed by the magnetic sensing element of the device 56.

The output signal from the device 56 is a feedback signal which is received by the solenoid controller. By providing feedback, the resulting closed-loop control system provides for true speed operation.

As described above, the number of forward struts (i.e. 14) is greater than the number of reverse struts (i.e. one or two). Also, the number of reverse notches is greater than the number of forward notches. In this situation, there is a possibility of a coupling assembly such as the coupling assembly 12 to enter a "lock-lock" condition wherein the transitional backlash (i.e., distance the clutch can move between forward and reverse directions) is extremely low.

This results in the locking elements not being allowed to drop out of their coupling positions upon command.

In order to avoid the above-described problem, the number of reverse struts and notches and the number of forward struts and notches are chosen so that the forward backlash is a non-zero integer multiple (i.e. "N") of the reverse backlash and the forward pockets are uniformly angularly spaced about the axis 16. The following is a table of 36 entries wherein only entries 11, 14 and 15 do not satisfy the above criteria.

| Entry | N | Reverse Notches | Reverse Struts | Reverse Backlash | Forward Notches | Forward Strut Sets | Forward Backlash | Transitional Backlash |
|---|---|---|---|---|---|---|---|---|
| 1 | 2 | 79 | 1 | 4.556962 | 79 | 2 | 2.278481 | 1.139241 |
| 2 | 2 | 77 | 1 | 4.675325 | 77 | 2 | 2.337662 | 1.168831 |
| 3 | 3 | 80 | 1 | 4.5 | 80 | 3 | 1.5 | 0.75 |
| 4 | 3 | 79 | 1 | 4.556962 | 79 | 3 | 1.518987 | 0.759494 |
| 5 | 3 | 77 | 1 | 4.675325 | 77 | 3 | 1.558442 | 0.779221 |
| 6 | 3 | 76 | 1 | 4.736842 | 76 | 3 | 1.578947 | 0.789474 |
| 7 | 3 | 74 | 1 | 4.864865 | 74 | 3 | 1.621622 | 0.810811 |
| 8 | 3 | 73 | 1 | 4.931507 | 73 | 3 | 1.643836 | 0.821918 |
| 9 | 3 | 71 | 1 | 5.070423 | 71 | 3 | 1.690141 | 0.84507 |
| 10 | 3 | 70 | 1 | 5.142857 | 70 | 3 | 1.714286 | 0.857143 |
| 11 | 3 | 62 | 1 | 5.806452 | 62 | 3 | 1.935484 | 0.967742 |
| 12 | 3 | 61 | 1 | 5.901639 | 61 | 3 | 1.967213 | 0.983607 |
| 13 | 3 | 59 | 1 | 6.101695 | 59 | 3 | 2.033898 | 1.016949 |
| 14 | 3 | 58 | 1 | 6.206897 | 58 | 3 | 2.068966 | 1.034483 |
| 15 | 3 | 56 | 1 | 6.428571 | 56 | 3 | 2.142857 | 1.071429 |
| 16 | 3 | 55 | 1 | 6.545455 | 55 | 3 | 2.181818 | 1.090909 |
| 17 | 3 | 53 | 1 | 6.792453 | 53 | 3 | 2.264151 | 1.132075 |
| 18 | 3 | 52 | 1 | 6.923077 | 52 | 3 | 2.307692 | 1.153846 |
| 19 | 1 | 79 | 2 | 2.278481 | 79 | 2 | 2.278481 | 1.139241 |
| 20 | 1 | 77 | 2 | 2.337662 | 77 | 2 | 2.337662 | 1.168831 |
| 21 | 1 | 79 | 3 | 1.518987 | 79 | 3 | 1.518987 | 0.759494 |
| 22 | 1 | 80 | 3 | 1.5 | 80 | 3 | 1.5 | 0.75 |
| 23 | 1 | 79 | 3 | 1.518987 | 79 | 3 | 1.518987 | 0.759494 |
| 24 | 1 | 77 | 3 | 1.558442 | 77 | 3 | 1.558442 | 0.779221 |
| 25 | 1 | 76 | 3 | 1.578947 | 76 | 3 | 1.578947 | 0.789474 |
| 26 | 1 | 74 | 3 | 1.621622 | 74 | 3 | 1.621622 | 0.810811 |
| 27 | 1 | 73 | 3 | 1.643836 | 73 | 3 | 1.643836 | 0.821918 |
| 28 | 1 | 71 | 3 | 1.690141 | 71 | 3 | 1.690141 | 0.84507 |
| 29 | 1 | 70 | 3 | 1.714286 | 70 | 3 | 1.714286 | 0.857143 |
| 30 | 1 | 61 | 3 | 1.967213 | 61 | 3 | 1.967213 | 0.983607 |
| 31 | 1 | 59 | 3 | 2.033898 | 59 | 3 | 2.033898 | 1.016949 |
| 32 | 1 | 58 | 3 | 2.068966 | 58 | 3 | 2.068966 | 1.034483 |
| 33 | 1 | 56 | 3 | 2.142857 | 56 | 3 | 2.142857 | 1.071429 |
| 34 | 1 | 55 | 3 | 2.181818 | 55 | 3 | 2.181818 | 1.090909 |
| 35 | 1 | 53 | 3 | 2.264151 | 53 | 3 | 2.264151 | 1.132075 |
| 36 | 1 | 52 | 3 | 2.307692 | 52 | 3 | 2.307692 | 1.153846 |

General Advantages

Wiring is outside the transmission.

Eliminates the difficulty in routing lead wires from the clutch around rotating parts to the bulk head inside the box.

Does not impact the number of wires passing through the bulk head connector.

Coils are potted, leads are over molded, connector is external, completely segregated from the hot oil environment which prevents:

Long term embrittlement of connector and wire insulation from hot oil exposure;

Eliminates the possibility of contamination in oil shorting the circuit to power; and Vibration failures are greatly reduced (potted and over molded).

High Power Density—every surface of the inner and outer race is used. The radial surfaces are for reverse and the planar surfaces are for 1st gear. They are independent and do not compete for the same real estate in the races. The concentric design competes for radial cross section and co-planar designs add a PM race. The largest possible strut/cam geometry can be used in a smaller package. This increases the power density of the clutch.

Using the SSI 14 as a common electro-mechanical component.

Tend to make it a high volume commodity thus reducing cost.

Streamlines design, validation, and manufacturing—one and done approach.

Better resource allocation. Engineering can focus on clutch design without the burden of designing a new electro-mechanical solution for each unique application.

Eliminate the slide plate and failure modes associated with the slide plate.

Traditional MD approach—no concentric, co-planar design. Tried and true approach.

Cost competitive—highest power density, 2 races, and an across the board approach for controls using the SSIs 14.

Reduction of partial engagements.

The SSI 14 strut 52 turns on faster than a hydraulic design using a slide plate.

The SSI 14 can be turned on closer to the sync point when doing a rolling forward reverse shift because it takes only 20 ms or less to fire on. No hydraulic delay or temperature effects.

Soft turn off capable reduces impact loads when turning off

No special driver is required. The SSI 14 can fire initially and can be PWMed down to hold on. The higher pulse is to overcome a return spring designed for a 20 g impact.

NVH Advantages—Maximizing cams is great approach to reducing backlash. Many more cams can be formed into the race in the radial direction as opposed to the planar direction. Using the SSI 14 in the radial direction takes advantage of this feature.

Usually there is one outer race where the forward and reverse flanks of a spline are the path to ground. This design splits the paths. There is no backlash in the reverse direction as the path passes through a press fit SSI 14 into the case 40. The SSI 14 only reacts reverse torque. The outer race for the passive clutch conversely only sees forward reaction torque. The result is a system where the clutch does not travel through an external lash. The drive side spline stays on the drive side and the reverse drive path is in a press fit SSI 14. This reduces tick/clunk in the splines. A rubber washer/spring clip can be added to the coast side of the spline to keep the spline engaged with the case at all times. It never experiences reverse torque.

Advantages Over Hydraulic

Temperature insensitive.

Faster reaction time with small tolerance (20 ms or less).

Much less energy to operate over life of application.

Easier to route wires outside of box compared to packaging worm trails.

Easy for diagnostic—software maintenance loop with a trickle voltage can measure resistance for temperature, continuity, or a short instantly setting a code.

Contamination insensitive

Advantages of Two Springs

If the armature 76 was directly connected to the strut 52 with a single return spring, a constant high current would have to be applied to ensure the device turns ON. The lowest stroking force occurs initially at the highest gap when the armature 76 is in the OFF position. If the armature 76 was directly attached to the strut 52 and the strut 52 was in between notches or teeth 30, a high current would have to be held to ensure the device would always stroke to ON eventually. The cam plate 22 would have to rotate so the strut 52 could drop in. So a consistently high current would have to be maintained as long as the solenoid 14 was ON. This is a problem. The solenoid 14 could overheat using this approach. The solution is to use two springs 66 and 76, an actuator core or armature 76, and a second internal piston called the plunger 70 that attaches to the strut 52 via a clevis connection. In this arrangement, the armature 76 always strokes ON and travels the full 3 mm closing the gap independent of the position of the strut 52 relative to the cams or teeth 30. The forces keeping the armature 76 in the ON position increase by a magnitude when the gap is closed. The armature 76 pushes the second spring 74 that pushes the plunger 70 attached to the strut 52.

Once the armature 76 strokes the 3 mm, the current can be dropped to a holding current that is a fraction of the initial pulse current. The strut 52 is loaded by the second spring 74 in the apply direction. If the strut 52 is in between cams or teeth 30, there is a second spring force pushing the strut 52 into the ON position as soon as the cam plate 22 rotates. The armature 70 is now independent of strut position and can be PWMed.

If one used a single spring in a tooth butt condition, the armature 76 would only stroke 1.3 mm and stop with a force of about 2 lbs. In a two-spring system the armature 76 always strokes the full 3 mm in 20 ms allowing the current to drop to a holding current. The second spring 74 applies the force to exit tooth butt.

Advantages of Speed Sensor with the Component (i.e. SSI)

The prior art has a speed sensor that passes through the outside of the outer race of the clutch to sense the speed of the inner race. It was presumed that it is for the non-sync reverse shift when rolling in the forward direction.

At least one embodiment of the present invention provides the structure for a speed sensor chip set. It is possible to pot in a speed sensor chip set right into the SSI 14. This has the advantage of flexing the structure of the SSI 14 to not only lock the inner race to ground in reverse, but also to sense the inner race speed all in the same part. This would eliminate the stand alone speed sensor, case machining and clutch machining to accommodate the stand alone speed sensor. This is a significant cost save.

Referring now to FIGS. 8-26, there is illustrated an embodiment of the present invention wherein parts which are the same or similar to the parts of FIGS. 1-7 in either structure and/or function have the same reference number added to the number "100".

Also, parts of a second or third embodiment have the same reference number but a single or double prime designation, respectively.

A coupling and control assembly, generally indicated at 112, includes a speed sensor 156 (FIGS. 22-26) for providing an electrical signal for electronic transmission control. The sensor 156 is generally of the same type as the sensor 56 of FIGS. 1-7.

The assembly 112 includes a controllable coupling assembly, having first and second coupling members 118 and 122, respectively, supported for rotation relative to one another about a rotational axis 116. The electrical signal from the speed sensor 156 is based on the relative rotary speed of the second coupling member 122.

Figure 17:
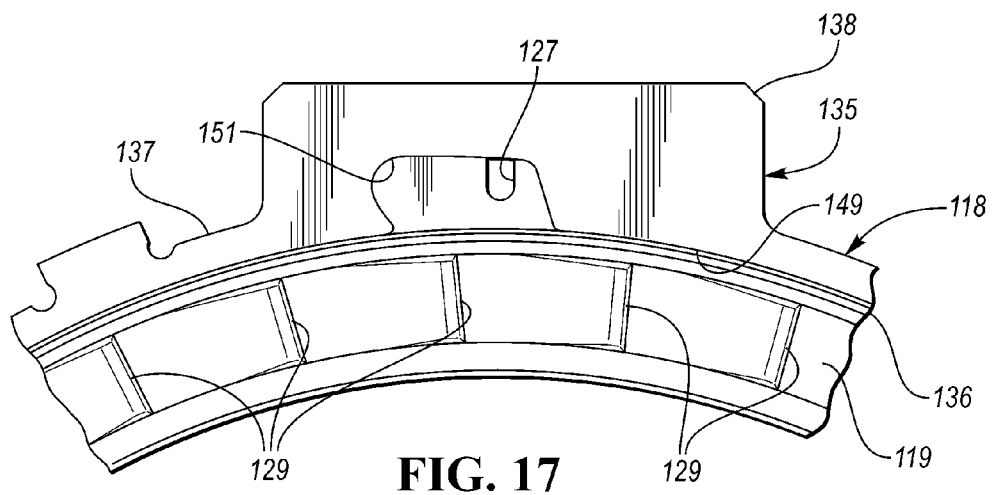
FIG. 17 is a side elevational view, partially broken away, of the coupling member of FIGS. 15 and 16.
Figure 18:
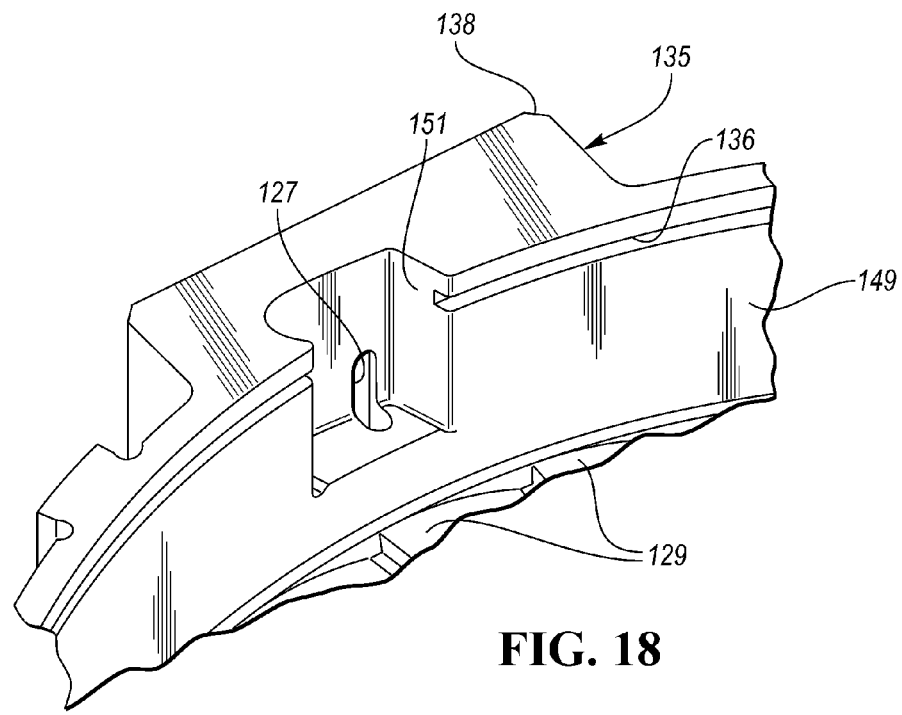
FIG. 18 is a side, schematic perspective view, partially broken away, of the coupling member of FIGS. 15-17.

The first coupling member 118 has a first coupling face 149 (FIGS. 17 and 18) oriented to face radially with respect to the axis 116 and has a locking element 152 (FIGS. 20-23, 152' in FIGS. 24 and 25 and 152" in FIG. 26) disposed within a pocket or recess 151 (or 151' or 151", respectively). The recess 151 defines a load bearing first surface shoulder 153 or 153' or 153". The sensor 156 is also disposed within the recess 151 (or 151' or 151"). The first coupling member 118 also has a coupling face 119 oriented to face axially with respect to the axis 116. The coupling face 119 (FIG. 22) has a set of axially spaced, locking formations 129 formed therein (FIGS. 17 and 18).

Figure 22:
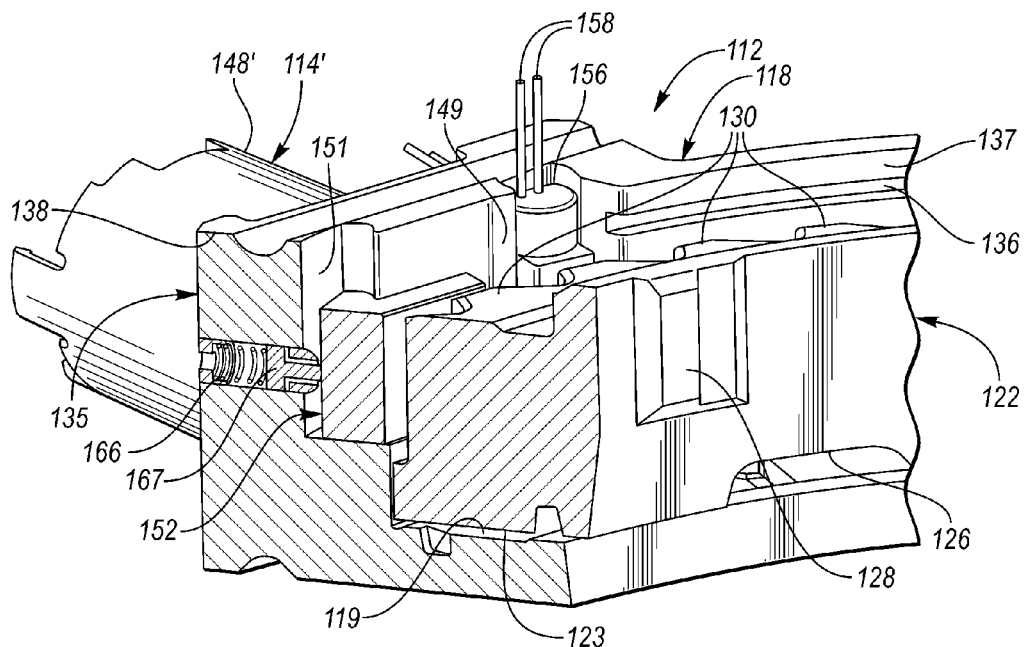
FIG. 22 is a schematic perspective bottom view, partially broken away and in cross section and similar to the view of FIG. 21, but also showing a speed sensor.

The second coupling member 122 has a set of splines 128 formed on its inner diameter (FIGS. 8, 9 and 23), a second coupling face 125 oriented to face radially with respect to the axis 116 and a set of ferromagnetic or magnetic locking formations or teeth 130 on its outer diameter. Each tooth 130 defines a load-bearing surface shoulder 131. The second coupling member 122 also has an axially facing coupling face 123 with a set of angularly spaced forward pockets 126 (one of which is shown in FIG. 22) for receiving and retaining a set of angularly spaced forward pawls (not shown but similar to the pockets 26 and the struts 20 in FIG. 2).

The first and second members 118 and 122, respectively, are positioned relative to each other so that the locking element 152 (or the locking elements 152' and 152") and the sensor 156 are in close-spaced opposition to the locking formations 130.

The assembly 112 also includes a locking ring or plate 124 for insertion into an annular groove 136 formed in an axially extending wall 137 of the coupling member 118 to hold the coupling members 118 and 122 together.

The first coupling member 118 includes a cutout or hole 132 which extends into a raised portion 135 of the member 118. A slit 127 extends completely through the member 118 from the hole 132 to the face 149.

Figure 19:
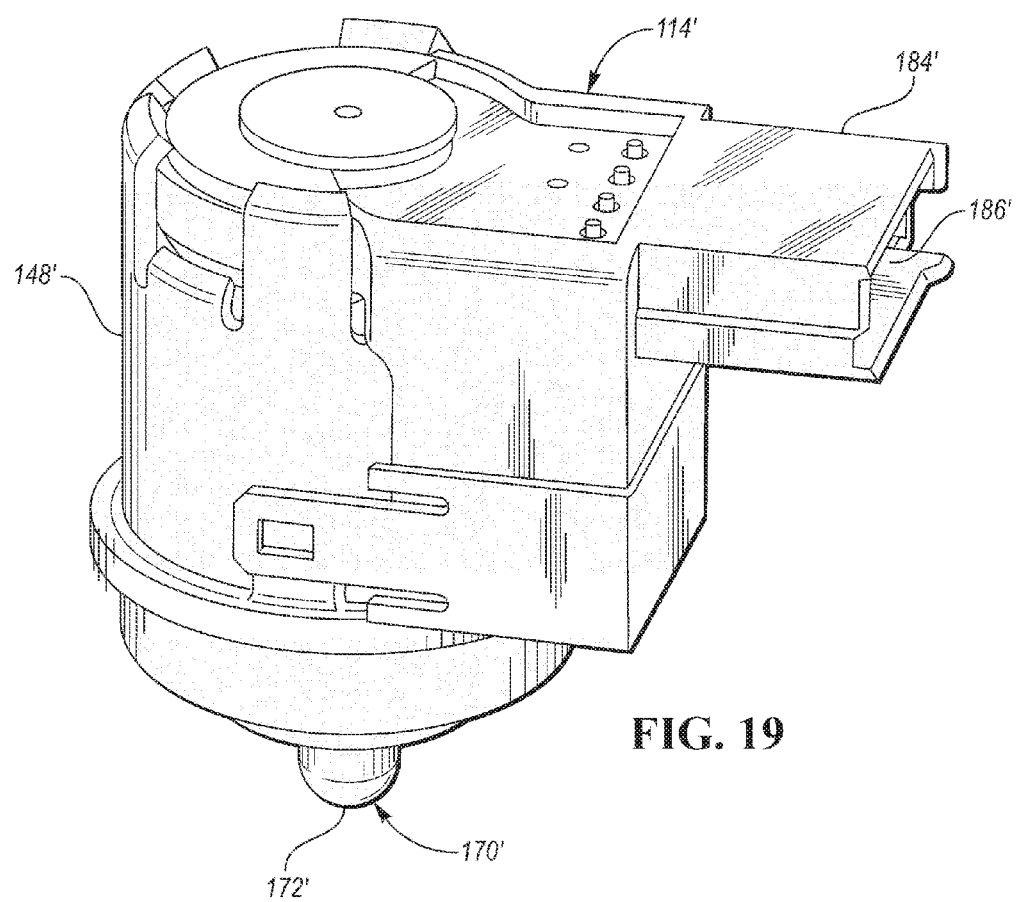
FIG. 19 is a schematic perspective top view of another embodiment of the electromechanical component with a printed current board with electrical components supported on a top surface of the component.
Figure 20:
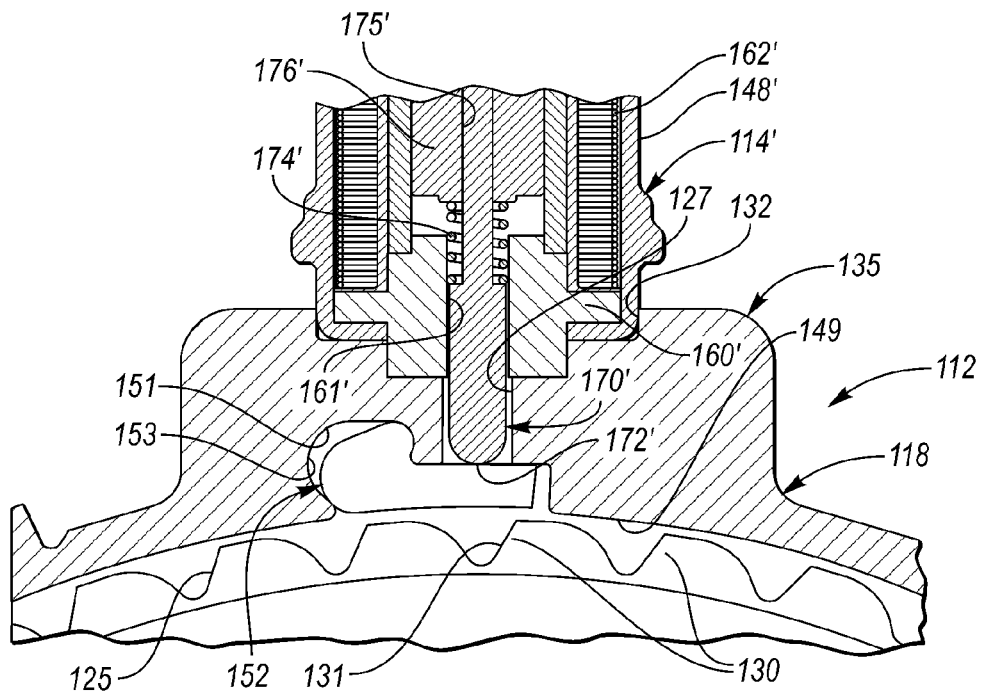
FIG. 20 is a side view, partially broken away and in cross section, of the component attached to the raised portion of the outer coupling member and with a radial pawl shown in its uncoupling or retracted position.

The assembly 112 also includes an electromechanical component, generally indicated at 114 and 114' (FIG. 19), and includes a reciprocating member 170 (or 170' in FIG. 19). The component 114 is supported in the hole 132 so that the reciprocating member 170 reciprocates in the slit 127 and moves the locking element 152 across a gap between the coupling faces 149 and 125 in response to the component 114 receiving an electrical control signal. The locking element 152 abuttingly engage one of the locking formations 130 in a coupling position of the locking element 152 (i.e. FIGS. 21 and 24) to prevent relative rotation in one direction about the axis 116. The component 114 has a housing 148 which is held in the hole 132 by a u-shaped bracket 129 having legs 133 and a resilient gripping portion 135 which grip beveled portions 138 of the raised portion 135.

The component 114' is preferably generally of the type disclosed in published U.S. patent application No. 2015/0061798. As described therein, the component 114' is an electromagnetic solenoid 114' including a housing 148' and having a bottom part 160' with an aperture 161' in which the member 170' reciprocates at a first end and a magnetic coil 162' supported within the housing 148' An armature 176' is supported for axial movement within the housing 148' between first and second positions when the coil 162' is energized with a predetermined electrical current. The distance between the first and second positions defines a stroke length wherein the armature 176' exerts a substantially constant force along its stroke length during axial movement of the armature 176' between the first and second positions. A pin or the reciprocating member 170' is biased by a spring 174' which extends between the member 170' and the armature 176' to move axially between first and second positions. The spring 174' biases the member 170' towards the second coupling member 122.

The sensor 156 senses magnetic flux to produce an electrical output signal indicative of a speed of the relative rotation of the second coupling member 122. A variable magnetic field is generated in response to rotation of the locking formations 130 past the sensor 156.

The sensor 156 preferably includes a magnetic field sensing element. The sensor 156 may be back-biased wherein the locking formations 130 are ferromagnetic. The sensor 156 has wires 158 which together with the wires (not shown) of the coil 162 extend through a cavity 186 of an overmold 184 and are coupled to a solenoid controller.

The locking formations 130 may comprise radially extending, angularly-spaced teeth 130.

The locking element 152 or 152' or 152" is preferably a radial pawl.

As best shown in FIG. 22, the second coupling member 122 has a width wherein each locking formation 130 extends the entire width of the second coupling member 122.

The first coupling member 118 preferably is an outer coupling member and the second coupling member 122 is preferably an inner coupling member.

Figure 23:
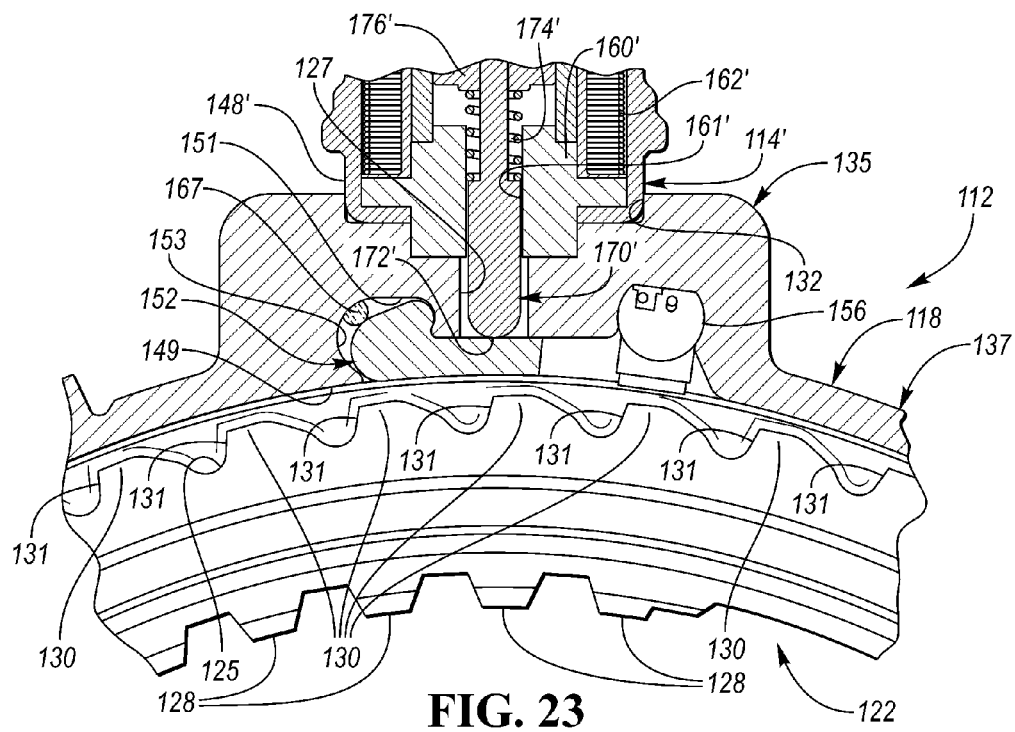
FIG. 23 is a side view, partially broken away and in cross section and similar to the views of FIGS. 21 and 22, with the pawl in its retracted position and further illustrating the inner coupling member.
Figure 25:
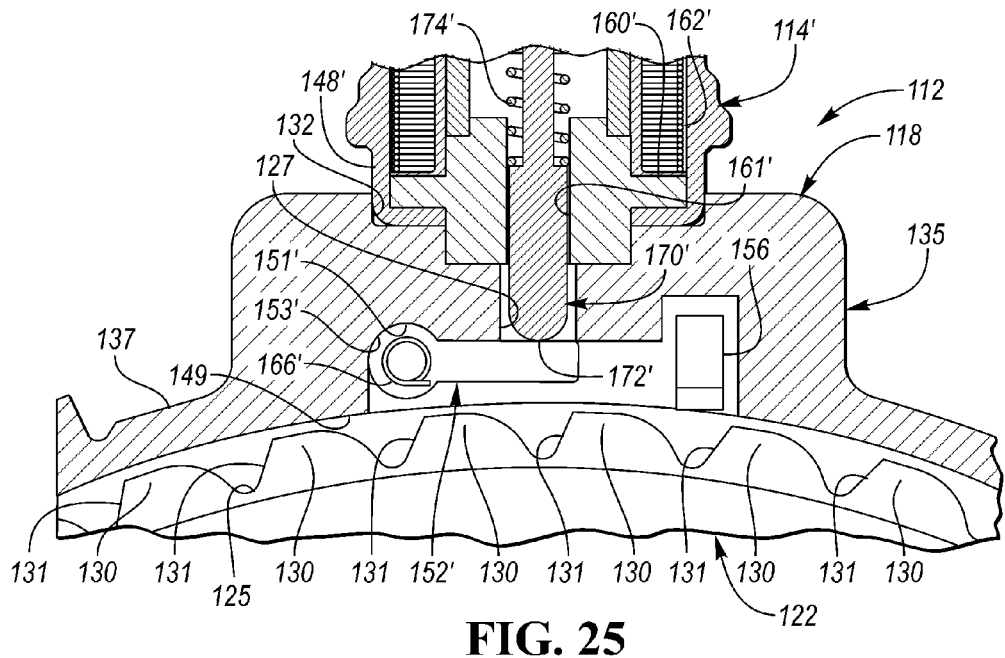
FIG. 25 is a view, similar to the view of FIG. 24, but with the plunger in its retracted position and the pawl in its "off" or uncoupling position.

The assembly 112 may further comprise a spring or biasing member 166 or 166' to bias the locking member 152 or 152' or 152" towards an uncoupling position as shown in FIGS. 22, 23 and 25. The biasing member 166 biases a vented pin 167 to engage the heel of the locking member 152 and bias the member 152 towards its uncoupling position. The pin 167 is vented to permit lubricating oil to flow therethrough.

Figure 21:
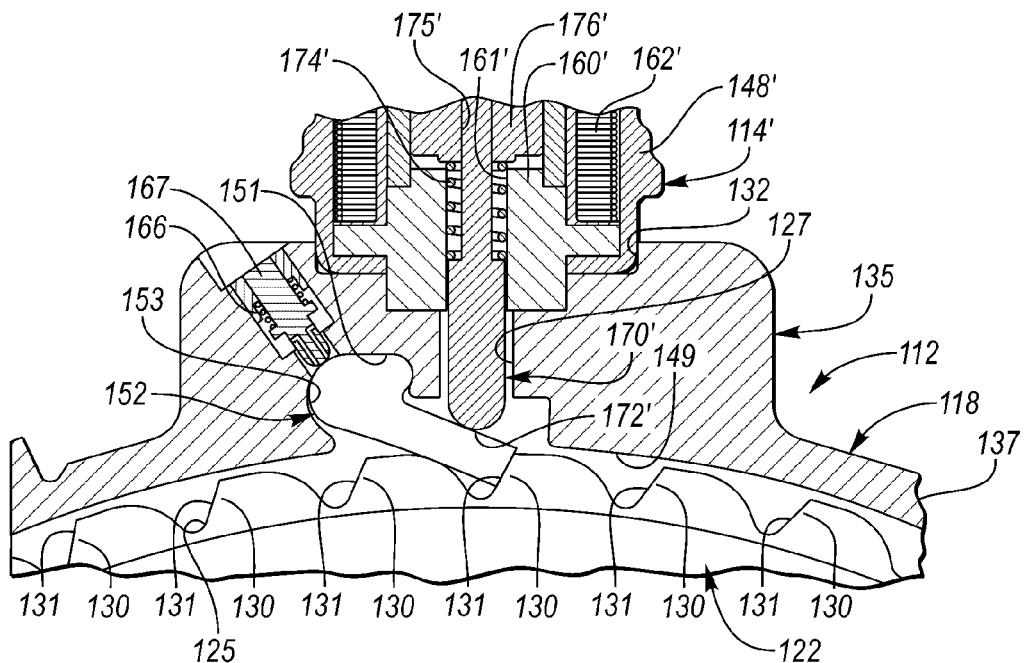
FIG. 21 is an enlarged side view, partially broken away and in cross section and similar to the view of FIG. 20, but further including a vented, spring-loaded plunger on the heel of a pawl which is in its extended, coupling position.
Figure 24:
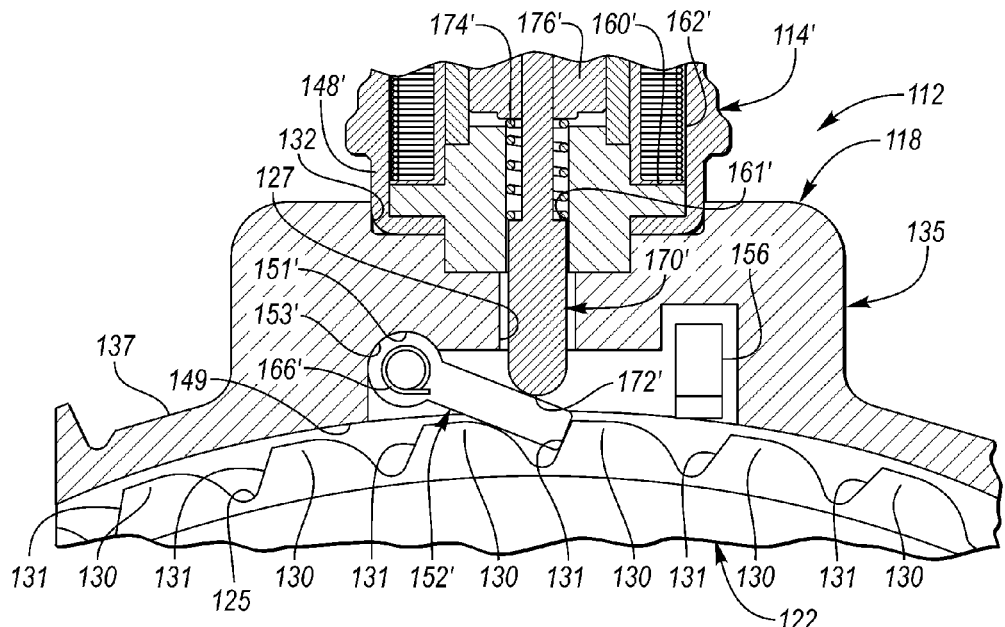
FIG. 24 is an enlarged side view, partially broken away and in cross section, showing a spring-loaded radial pawl pushed by a plunger or reciprocating member of the electromechanical component into its coupling position in which the pawl abuttingly engages a tooth on the inner coupling member.

The biasing member 174' biases the reciprocating member 170' to its extended position as shown in FIGS. 21 and 24.

Figure 26:
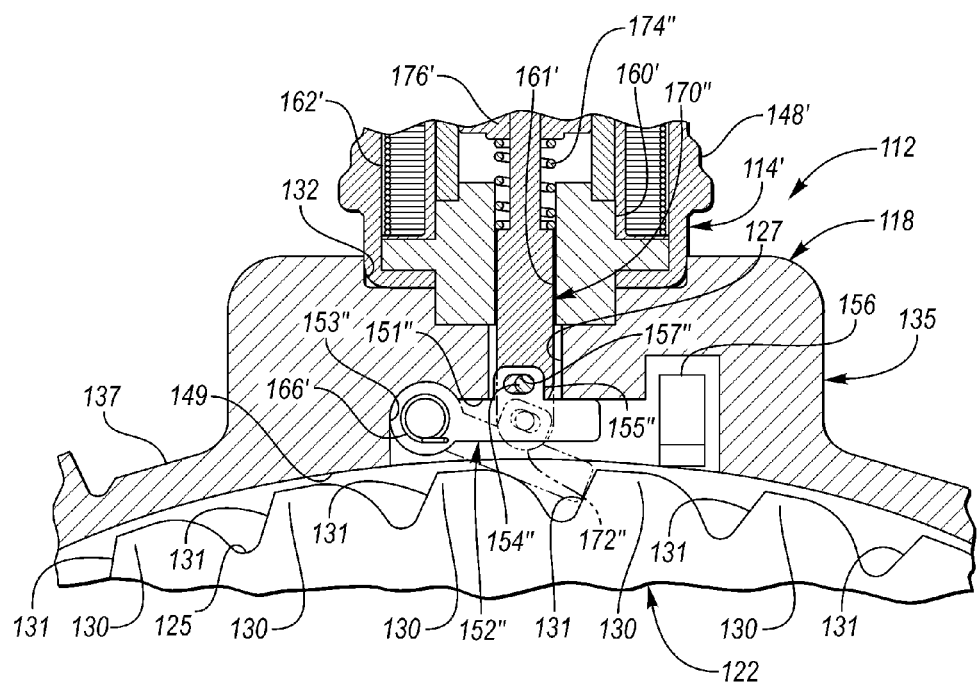
FIG. 26 is a view similar to the views of FIGS. 24 and 25 but with the pawl attached or connected to a free or distal end of the reciprocating member or plunger via a clevis-type connection (not dissimilar to the connection of FIG. 7); the coupling position of the pawl is shown by phantom lines.

A reciprocating member 170" and a locking element 152" of a different embodiment may be connected together as shown in FIG. 26 via a clevis-type connection. The connection is defined by a pair of spaced leg portions 155" integrally formed at a bottom surface of the element 152" which provide an attachment location for a leading or distal end 172" of the reciprocating member 170". As in the embodiment of FIGS. 1-7, each leg portion 155" has an aperture 157". A pivot pin 154" is received within each aperture 157" and an aperture formed in the leading end 172" to allow rotational movement of the element 152" in response to reciprocating movement of the reciprocating member 170".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly including a sensor for providing an electrical signal for electronic transmission control, the assembly comprising: a controllable coupling assembly including first and second coupling members supported for rotation relative to one another about a rotational axis, the first coupling member having a first coupling face oriented to face radially with respect to the axis and having a locking element and a sensor, the second coupling member having a second coupling face oriented to face radially with respect to the axis and having a set of ferromagnetic or magnetic locking formations, the first and second members being positioned relative to each other so that the locking element and the sensor are in close-spaced opposition to the locking formations; and an electromechanical component including a reciprocating member, the component being supported so that the reciprocating member moves the locking element across a gap between the coupling faces in response to the component receiving an electrical control signal, the locking element abuttingly engaging one of the locking formations in a coupling position of the locking element to prevent relative rotation in one direction about the axis, the sensor sensing magnetic flux to produce an electrical output signal indicative of a speed of the relative rotation wherein a variable magnetic field is generated in response to rotation of the locking formations past the sensor.

2. The assembly as claimed in claim 1, wherein the sensor includes a magnetic field sensing element.

3. The assembly as claimed in claim 1, wherein the sensor is back-biased and wherein the locking formations are ferromagnetic.

4. The assembly as claimed in claim 1, wherein the locking formations comprise radially extending, angularly-spaced teeth.

5. The assembly as claimed in claim 1, wherein the component comprises a solenoid.

6. The assembly as claimed in claim 1, wherein the locking element is a radial pawl.

7. The assembly as claimed in claim 1, wherein the second coupling member has a width and wherein each locking formation extends the entire width of the second coupling member.

8. A controllable coupling assembly having multiple operating modes, the assembly comprising: first and second coupling members supported for rotation relative to one another about a common rotational axis in a first operating mode, the first coupling member including: a first coupling face oriented to face axially along the axis and having a set of locking formations, each of the set of locking formations defining a first load-bearing surface adapted for abutting engagement with a load-bearing surface of a first locking element in a second operating mode; and a second coupling face oriented to face radially with respect to the axis and having a reverse pocket receiving a reverse locking element and defining a second load-bearing surface adapted for abutting engagement with a load-bearing surface of the reverse locking element in a third operating mode.

9. The assembly as claimed in claim 1, further comprising a biasing member to bias one of the reciprocating member and the locking member.

10. The assembly as claimed in claim 9, wherein the biasing member biases the locking member towards an uncoupling position.

11. The assembly as claimed in claim 9, wherein the biasing member biases the reciprocating member to an extended position.

12. The assembly as claimed in claim 1, wherein the reciprocating member and the locking element are connected together so that the reciprocating member moves the locking element across the gap.

13. A coupling and control assembly including a sensor for providing an electrical signal for electronic transmission control, the assembly comprising: a controllable coupling assembly including first and second coupling members supported for rotation relative to one another about a rotational axis, the first coupling member having a first coupling face oriented to face radially with respect to the axis and having a locking element and a sensor, the second coupling member having a second coupling face oriented to face radially with respect to the axis and having a set of ferromagnetic or magnetic locking formations, the first and second members being positioned relative to each other so that the locking element and the sensor are in close-spaced opposition to the locking formations; and an electromechanical component including a reciprocating member, the component being supported so that the reciprocating member moves the locking element across a gap between the coupling faces in response to the component receiving an electrical control signal, the locking element abuttingly engaging one of the locking formations in a coupling position of the locking element to prevent relative rotation in one direction about the axis, the sensor sensing magnetic flux to produce an electrical output signal indicative of a speed of the relative rotation wherein a variable magnetic field is generated in response to rotation of the locking formations past the sensor.

14. The assembly as claimed in claim 13, wherein the second coupling member has a width and wherein each locking formation extends the entire width of the second coupling member.

15. The assembly as claimed in claim 13, wherein the sensor includes a magnetic field sensing element.

16. The assembly as claimed in claim 13, wherein the sensor is back-biased and wherein the locking formations are ferromagnetic.

17. The assembly as claimed in claim 13, wherein the set of ferromagnetic or magnetic locking formations comprise radially extending, angularly-spaced teeth.

18. The assembly as claimed in claim 13, wherein the component comprises a solenoid.

19. The assembly as claimed in claim 13, wherein the locking element is a radial pawl.

20. The assembly as claimed in claim 13, wherein the first coupling member is an outer coupling member and the second coupling member is an inner coupling member.

21. The assembly as claimed in claim 13, wherein the reciprocating member and the locking element are connected together so that the reciprocating member moves the locking element across the gap.

22. The assembly as claimed in claim 13, further comprising a biasing member to bias one of the reciprocating member and the locking member.

23. The assembly as claimed in claim 22, wherein the biasing member biases the locking member towards an uncoupling position.

24. The assembly as claimed in claim 22, wherein the biasing member biases the reciprocating member to an extended position.

* * * * *